(12) United States Patent
Boyd et al.

(10) Patent No.: US 11,574,005 B2
(45) Date of Patent: Feb. 7, 2023

(54) CLIENT APPLICATION CONTENT CLASSIFICATION AND DISCOVERY

(71) Applicant: Snap Inc., Santa Monica, CA (US)

(72) Inventors: Nathan Kenneth Boyd, Los Angeles, CA (US); Andrew Grosvenor Cooper, Los Angeles, CA (US); Suraj Vindana Samaranayake, New York, NY (US); Vu Tran, Weehawken, NJ (US); Yamill Vallecillo, Los Angeles, CA (US); Yiwen Zhan, Venice, CA (US)

(73) Assignee: Snap Inc., Santa Monica, CA (US)

( * ) Notice: Subject to any disclaimer, the term of this patent is extended or adjusted under 35 U.S.C. 154(b) by 57 days.

(21) Appl. No.: 16/885,849

(22) Filed: May 28, 2020

(65) Prior Publication Data
US 2021/0373726 A1 Dec. 2, 2021

(51) Int. Cl.
*G06F 16/58* (2019.01)
*G06F 3/0484* (2022.01)
(Continued)

(52) U.S. Cl.
CPC ........ *G06F 16/5866* (2019.01); *G06F 3/0482* (2013.01); *G06F 3/0484* (2013.01);
(Continued)

(58) Field of Classification Search
CPC .. G06F 16/583; G06F 16/5866; G06F 40/169; G06F 3/0484; G06F 3/0482; G06F 40/30; H04L 51/10; H04L 51/18; G06Q 50/01; G06T 11/60; G06T 7/70; G06K 9/6267
See application file for complete search history.

(56) References Cited

U.S. PATENT DOCUMENTS 7,945,653 B2 * 5/2011 Zuckerberg ............ G06Q 30/02
709/223
9,135,311 B2 * 9/2015 Decker ............... G06F 16/2471
(Continued)

FOREIGN PATENT DOCUMENTS

KR 101523349 B1 5/2015
KR 20190063352 A 6/2019
(Continued)

OTHER PUBLICATIONS

Bylinskii et al., "Understanding Infographics through Textual and Visual Tag Prediction", arXiv:1709.09215 [cs.CV], Sep. 26, 2017, pp. 1-11 (Year: 2017).*
(Continued)

*Primary Examiner* — Andrew L Tank
(74) *Attorney, Agent, or Firm* — Schwegman Lundberg & Woessner, P.A.

(57) ABSTRACT

In one or more implementations, content generated using a client application may be associated with a classification. The content may be accessed based on one or more classifications associated with the content. Content may be generated by a client application executed by a client device of a content creator and sent to a server system that may distribute the content to one or more additional client devices of recipients of the content. The server system may also aggregate content having a same classification.

20 Claims, 16 Drawing Sheets

(51) Int. Cl.
*G06K 9/62* (2022.01)
*G06F 40/30* (2020.01)
*G06F 3/0482* (2013.01)
*G06T 11/60* (2006.01)
*G06F 16/583* (2019.01)
*H04L 51/10* (2022.01)
*G06T 7/70* (2017.01)
*G06Q 50/00* (2012.01)

(52) U.S. Cl.
CPC ............ *G06F 16/583* (2019.01); *G06F 40/30* (2020.01); *G06K 9/6267* (2013.01); *G06T 11/60* (2013.01); *H04L 51/10* (2013.01); *G06Q 50/01* (2013.01); *G06T 7/70* (2017.01); *G06T 2200/24* (2013.01)

(56) References Cited

U.S. PATENT DOCUMENTS

| | | | | |
|---|---|---|---|---|
| 9,720,894 | B1* | 8/2017 | Pasko | G06F 40/169 |
| 9,959,503 | B2* | 5/2018 | Vickrey | H04L 51/32 |
| 10,127,287 | B1* | 11/2018 | Evans | G06F 16/9535 |
| 10,176,500 | B1* | 1/2019 | Mohan | G06Q 30/0277 |
| 10,250,547 | B1* | 4/2019 | Jain | H04L 51/32 |
| 10,325,221 | B2* | 6/2019 | Bannur | G06N 20/00 |
| 10,454,857 | B1* | 10/2019 | Blackstock | A63F 13/58 |
| 10,636,187 | B2* | 4/2020 | Ahuja | G06T 5/001 |
| 10,684,738 | B1* | 6/2020 | Sicora | G06F 16/435 |
| 11,012,389 | B2* | 5/2021 | Garrido | G06K 9/00255 |
| 11,100,182 | B1* | 8/2021 | Paul | G06F 16/9535 |
| 2003/0043172 | A1 | 3/2003 | Li et al. | |
| 2011/0022602 | A1* | 1/2011 | Luo | G06F 16/24578 707/748 |
| 2013/0262588 | A1* | 10/2013 | Barak | G06K 9/00221 709/204 |
| 2014/0075335 | A1* | 3/2014 | Hicks | G06Q 10/10 715/753 |
| 2016/0063117 | A1* | 3/2016 | Carter | G06F 16/24522 707/727 |
| 2017/0132821 | A1* | 5/2017 | Valliani | G06K 9/6267 |
| 2017/0140250 | A1* | 5/2017 | Maloney | G06T 11/60 |
| 2017/0193280 | A1* | 7/2017 | Huang | G06F 16/44 |
| 2018/0246983 | A1* | 8/2018 | Rathod | G06F 16/9566 |
| 2020/0117938 | A1* | 4/2020 | Greenberger | G06Q 30/0631 |
| 2020/0125802 | A1 | 4/2020 | Wigder et al. | |
| 2021/0065454 | A1* | 3/2021 | Goodrich | G06T 7/194 |
| 2021/0264517 | A1* | 8/2021 | Harris | G06Q 40/04 |

FOREIGN PATENT DOCUMENTS

| | | |
|---|---|---|
| WO | WO-2018040059 A1 | 3/2018 |
| WO | WO-2021242771 A1 | 12/2021 |

OTHER PUBLICATIONS

"Surprise!", [Online] Retrieved from the Internet: <URL: https://www.snap.com/en-US/news/post/surprise>, (Oct. 3, 2013), 1 pg.

Buscemi, Scott, "Snapchat introduces 'Stories', a narrative built with snaps", [Online] Retrieved from the Internet: <URL: https://9to5mac.com/2013/10/03/snapchat-introduces-stories-a-narrative-built-with-snaps/>, (Oct. 3, 2013), 2 pgs.

Etherington, Darrell, "Snapchat Gets Its Own Timeline With Snapchat Stories, 24-Hour Photo & Video Tales", [Online] Retrieved from the Internet: <URL: https://techcrunch.com/2013/10/03/snapchat-gets-its-own-timeline-with-snapchat-stories-24-hour-photo-video-tales/>, (Oct. 3, 2013), 2 pgs.

Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

"International Application Serial No. PCT/US2021/034077, International Search Report dated Sep. 8, 2021", 4 pgs.

"International Application Serial No. PCT/US2021/034077, Written Opinion dated Sep. 8, 2021", 4 pgs.

Bradford, Alina, "Everything you need to master Instagram Stories", CNET, [Online] Retrieved from the Internet: <URL: https://www.cnet.com/tech/services-and-software/how-to-use-instagram-stories/>, (Apr. 24, 2018), 18 pgs.

* cited by examiner

CLIENT APPLICATION CONTENT CLASSIFICATION AND DISCOVERY

BACKGROUND

Applications executed on client devices may be used to generate content. For example, client applications may be used to generate messaging content, image content, video content, audio content, media overlays, documents, creative artwork, combinations thereof, and the like. In various situations, this content may be exchanged between client devices via a computational system that enables the communication of content between client devices.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
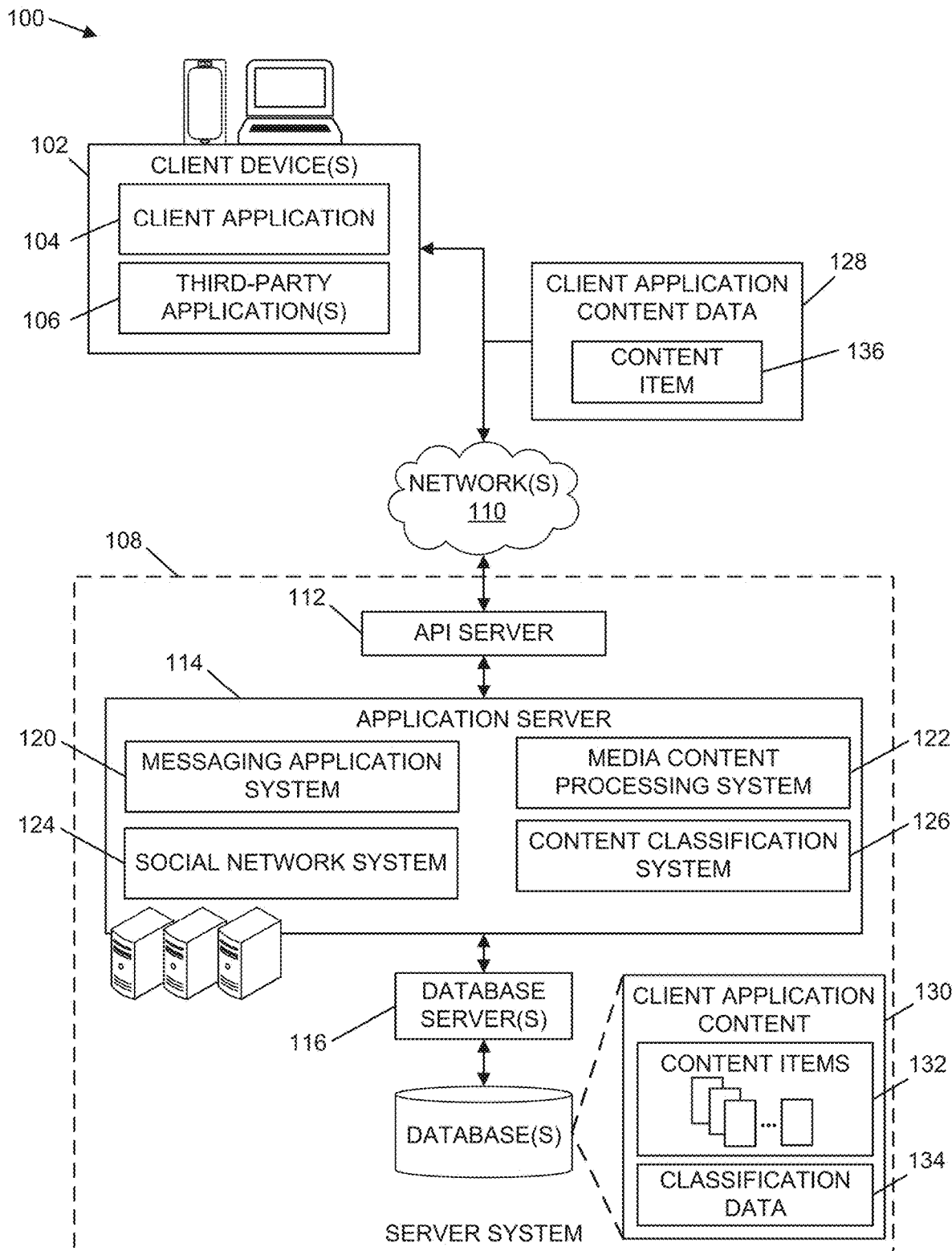
FIG. 1 is a diagrammatic representation of an architecture for exchanging data (e.g., messages and associated content) over a network, according to one or more example implementations.

Content may be created using applications that are executed by client devices. For example, a client application may be used to create messages that can be exchanged between client devices of users. In these situations, the client application can include at least one of a messaging application or a social networking application. The messages may include content, such as text content, video content, audio content, image content, or one or more combinations thereof. Client applications may also be used outside of a messaging context to generate at least one of text content, image content, video content, or audio content that can be shared between client devices.

Client applications may be implemented by a large number of users, such as thousands of users, up to millions of users, to generate content. Thus, the volume of content generated using a client application can be large. The content generated using the client applications may be varied and be associated with a number of different topics, such as locations, events, various objects, individuals, or animals. In many situations, the content created using client applications is shared with a number of other users. In conventional systems, though, the large amounts of content are not created in a manner that enables individuals to easily discover content that they might be interested in. Additionally, it can be challenging for users to publish their content in a way that is discoverable by additional users. Typically, conventional systems are limited in the ways that content is classified and in the channels that may be used to discover content that is of interest to users. For example, typical social networking platforms enable users to post content to a personal page or account that may include content that is accessible publicly. However, the content that is publicly posted by users is often discovered based on the identity of the user and not based on a topic that is related to the content. Additionally, the number of ways that content may be categorized by conventional systems is also limited and may be dependent on user input.

The systems, methods, techniques, instruction sequences, and computing machine program products described herein are directed to the classification of content generated using client applications and to accessing content based on one or more classifications associated with the content. Content may be generated by a client application executed by a client device of a content creator and sent to a server system that may distribute the content to one or more additional client devices of recipients of the content. The server system may also determine one or more classifications for content and aggregate content having a same classification. Content associated with a classification may be accessible to other users based on the classification. In various examples, content may be accessible without providing an identifier of the user that created the content.

In various implementations, content may be created by users of a client application. The client application may include social networking functionality. Additionally, the client application may provide messaging functionality. In one or more implementations, a client device may capture content, such as image content or video content, in conjunction with a client application. The client application may utilize one or more input devices, such as at least one of one or more cameras or one or more microphones of the client device, and control operation of the one or more input devices within the client application. Data corresponding to the content may be used to determine one or more classifications for the content. In one or more illustrative examples, a user of the client application may provide data that is used to determine one or more classifications of the content. For example, a user of the client application may provide text for a caption, comment, annotation, or message corresponding to an image or video that may be used to determine one or more classifications for the content. In at least some examples, the text may include an explicit classification for the content that may be marked by one or more symbols, such as a "#" symbol. Further, a user of the client application may implement a creative tool with respect to the content and one or more classifications for the content may be determined based on the creative tool. The creative tool may alter the appearance of image content or video content, add an overlay to at least one of image or video content, add an animation to image content or video content, or one or more combinations thereof. One or more classifications for content may also be determined according to the selection of at least one classification identifier for the content from a list of classification identifiers corresponding to a number of classifications.

In additional examples, data related to the content may be analyzed to implicitly determine one or more classifications of the content. To illustrate, image recognition techniques may be used to determine one or more objects included in image content or video content. A classification for the content may then be based on at least one of the objects included in the image content or video content. In addition, location data corresponding to a client device may be used to determine one or more classifications of content. In one or more examples, location data may be used to identify one or more events that may be taking place at or near the location and one or more classifications may be determined based on one or more events that are related to the content.

In one or more implementations, a server system may obtain content from a number of client devices of users of a client application and aggregate content having one or more classifications. In this way, the system may produce repositories of content having a same or similar classification. Users of the client application may access content associated with a classification of content by providing an identifier corresponding to the classification. In various examples, an order that the content is presented to a respective user may be based on a ranking of content that is determined based on one or more characteristics of the user. For example, the server system may analyze information of a user of the client application in relation to one or more characteristics of content associated with a classification to determine a level of interest of at least a portion of the content items having the classification. Based on the individual levels of interest, the server system may determine a ranking of a number of content items having the classification and cause the content items to be accessible to the user according to the ranking, such that content items having a relatively high level of interest for the user are presented to the user in one or more user interfaces of the client application before content items having a lower level of interest.

Accordingly, the systems, methods, techniques, instruction sequences, and computing machine program products described herein provide various implementations to classify content in a manner that makes content accessible to a greater number of users, if desired by the creator of the content, by providing discovery mechanisms for content that are lacking in conventional systems. Additionally, a number of different types of data and input may be used to determine classifications for content, which provides flexibility for content classification that is not found in conventional techniques and systems. For example, rather than relying on user input to determine classifications for content items, classifications of content items may be determined according to characteristics of content that are determined through an analysis of data associated with the content. In additional examples, classifications of content may be identified based on one or more characteristics of overlays included in content items.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the first client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102, in one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In an implementation, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the first client device 102, the second client device 104, and the server system 108 may be coupled via the one or more networks 110. One or more portions of the one or more networks 110 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of a public switched telephone network (PSTN), a cellular telephone network, a wireless network, a WI-FI network, a WiMax network, another type of network, or a combination of two or more such networks.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The application server 114 hosts a number of applications and subsystems, including a messaging application system 120, a media content processing system 122, a social network system 124, and a content classification system 126. The messaging application system 120 implements a number of message processing technologies and functions, particularly related to the aggregation and other processing of content (e.g., textual and multimedia content) included in messages received from multiple instances of the client application 104. For example, the messaging application system 120 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 120 may aggregate text and media content from multiple sources into collections of content. These collections are then made available, by the messaging application system 120, to the client application 104. Other processor- and memory-intensive processing of data may also be performed server-side by the messaging application system 120, in view of the hardware requirements for such processing.

The media content processing system 122 is dedicated to performing various media content processing operations, typically with respect to images, audio, or video received within the payload of a message or other content item at the messaging application system 120. The media content processing system 122 may access one or more data storages (e.g., the database(s) 118) to retrieve stored data to use in processing media content and to store results of processed media content.

The social network system 124 supports various social networking functions and services, and makes these functions and services available to the messaging application system 120. To this end, the social network system 124 maintains and accesses an entity graph within the database(s) 118. Examples of functions and services supported by the social network system 124 include the identification of other users of the client application 104 with which a particular user has relationships or is "following", and also the identification of other entities and interests of a particular user. The social network system 124 may access location information associated with each of the user's friends to determine where they live or are currently located geographically. In addition, the social network system 124 may maintain a location profile for each of the user's friends indicating the geographical location where the user's friends live.

The content classification system 126 may determine one or more classifications for content that is generated using the client application 104. The content may include text content, image content, video content, audio content, content annotations, or combinations thereof, that are produced using the client application 104. In one or more illustrative examples, the content may include image content having one or more annotations. The one or more annotations may include overlays that include at least one of text content, content produced using one or more creative took of the client application 104, one or more additional images, or one or more animations. After a user of the client device 102 has generated the content by providing input via the client application 104, the client device 102 may send data corresponding to the content to the server system 108. In various examples, client application content data 128 may be communicated between the client device 102 and the server system 108. The client application content data 128 may include data that corresponds to content generated using the client application 104 and sent to the server system 108 from the client device 102. In addition, the client application content data 128 may include data sent from the server system 108 to the client device 102 in relation to the client application 104. For example, the client application content data 128 may include data corresponding to content identified by the server system 108 based on one or more requests obtained from the client device 102. In addition, the client application content data 128 may include data corresponding to content for which a user of the client device 102 is a recipient.

The server system 108 may store at least a portion of the client application content data 128 in the database(s) 118 as client application content 130. The client application content 130 may include a number of content items 132. Each content item 132 may include one or more images, one or more videos, text, audio, one or more content annotations, or one or more combinations thereof. In various examples, an individual content item 132 may include a collection of images, videos, text, audio, content annotations, or combinations thereof. Additionally, the client application content 130 may include classification data 134. The classification data 134 may correspond to one or more classifications associated with respective content items 132. In one or more illustrative examples, the classification data 134 may include identifiers that correspond to respective classifications. At least a portion of the one or more classifications for a respective content item 132 may be determined by the content classification system 126. In further examples, at least one classification for a respective content item 132 may be determined by the client application 104.

In one or more implementations, the content classification system 126 may analyze portions of the client application content data 128 obtained from the client device 102 to determine one or more classifications of content generated by the client application 104. In various examples, the client application content data 128 may include a content item 136 that corresponds to a content item generated by the client application 104 and sent to the server system 108. The content classification system 126 may analyze data related to the content item 136 to determine one or more classifications corresponding to the content item. In one or more examples, data of the content item 136 may include image data and the content classification system 126 may analyze the image data to determine one or more objects that are included in the image. In these scenarios, the content classification system 126 may determine one or more classifications for the content item based on at least one object included in the image. In one or more additional examples, the content classification system 126 may determine one or more recommendations for classifications of the content item based on one or more objects included in the image.

Additionally, the content classification system 126 may analyze data corresponding to overlays of images. For example, users of the client application 104 may produce text content using the client application 104 that may overlay an image that is at least one of captured by the client device or stored by the client device 102. In further examples, users of the client application 104 may overlay additional image content or additional video content atop an image or video. In various examples, an overlay may be generated by one or more creative tools of the client application 104. In one or more examples, an overlay associated with an image may include an identifier of a classification. To illustrate, an overlay may include text that corresponds to an identifier of a classification. In one or more illustrative examples, the identifier of the classification may be identifiable by the use of a symbol, such as a "#" symbol. In these situations, the content classification system 126 may determine a classification for the content item 136 based on the identifier of the classification included in the overlay. The content classification system 126 may also determine a classification of the content item 136 based on a creative tool used to generate at least one of an overlay or an identifier of the overlay. In one or more implementations, an overlay may be associated with an identifier based on input from a creator of the overlay or a service provider that makes the overlay available to users of the client application 104. In one or more illustrative examples, an identifier of an overlay may include "Current Time" or "Current Temperature". In these situations, a classification of the content item 136 may correspond to the identifier associated with the overlay.

In one or more implementations, the content classification system 126 may determine a classification of the content item 136 based on selection of one or more classification identifiers by a user of the client device 102 with respect to the content item 136. For example, the client application 104 may generate a user interface that includes one or more identifiers of classifications for the content item 136. The one or more identifiers may include one or more recommendations of classifications for the content item 136. In various examples, the classification identifiers included in a user interface that may be selectable by a user of the client application 104 may be determined by at least one of the client application 104 or the content classification system 126 based on at least one of overlays related to the content item 136, image content data of the content item 136, such as objects included in an image of the content item 136, text data of the content item 136, additional annotation data for the content item 136, video data of the content item 136, or audio data of the content item 136. In one or more illustrative examples, identifiers of classifications may be included in a user interface generated by the client application 104 when a user of the client application 104 is selecting one or more recipients for the content item 136, in these scenarios, a user interface element corresponding to a classification identifier may be selectable to classify the content item 136 according to the classification related to the classification identifier.

After determining one or more classifications for the content item 136, the content classification system 126 may store the content item in the database(s) 118 as part of the content items 132. The content classification system 126 may also store one or more classification identifiers related to the content item 136 as part of the classification data 134. In one or more examples, the content classification system 126 may store the content item 136 in association with one or more classifications such that the content item 136 may be retrievable based on identifiers of the one or more classifications associated with the content item 136. To illustrate, the content item 136 may be retrieved in response to a request for content items corresponding to a classification identifier related to at least one classification of the content item 136. In this way, the content item 136 may be provided to users of the client application 104 as part of a collection of content items associated with at least one classification of the content item 136.

In one or more illustrative examples, the content item 136 may be associated with a classification of "classic cars". In these scenarios, the content item 136 may be stored in the database(s) 118 with respect to an identifier corresponding to "classic cars". In response to a request for content items associated with "classic cars", the content classification system 126 may identify the content item 136 and provide the content item 136 such that the content item 136 may be displayed in a user interface in conjunction with one or more additional content items related the classification "classic cars". In one or more implementations, the content classification system 126 may determine rankings for content items associated with one or more classifications before providing one or more of the content items in response to a request for content having the one or more classifications. The rankings for the content items may be based on information related to a user that is requesting content associated with the one or more classifications. For example, profile information of a user of the client application 104 that requests content related to "classic cars" may be analyzed by the content classification system 126 in relation to information of a number of content items associated with the classification "classic cars" to determine an order in which at least a portion of the content items associated with the classification "classic cars" is to be provided to the user via the client application 104.

Figure 2:
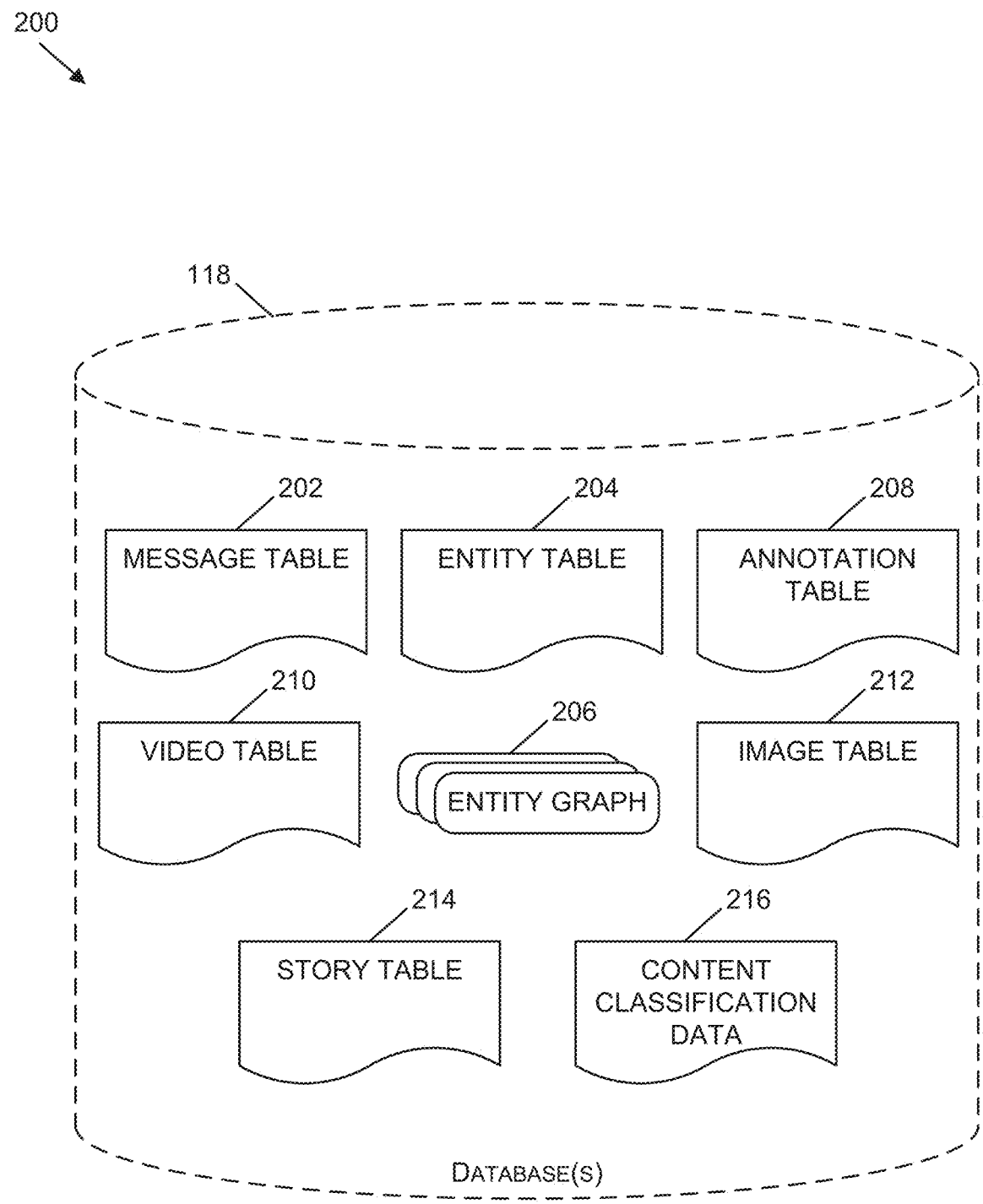
FIG. 2 is a schematic diagram illustrating data that may be stored in a database of a server system, according to one or more example implementations.

FIG. 2 is a schematic diagram illustrating data structures 200 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database(s) 118 may include message data stored within a message table 202. In various examples, the message data may correspond to one or more ephemeral messages that are stored for a limited duration. The entity table 204 may store entity data, including an entity graph 206. Entities for which records are maintained within the entity table 204 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 206 furthermore stores information regarding relationships and associations between entities. Such relationships may be social, professional (e.g., work at a common corporation or organization) interest-based, or activity-based, merely for example.

The database(s) 118 may also store annotation data, in the example form of filters, in an annotation table 208. Filters for which data is stored within the annotation table 208 are associated with and applied to videos (for which data is stored in a video table 210) or images (for which data is stored in an image table 212). Filters, in one example, are overlays that are displayed as overlaid on an image or video during presentation to a recipient user. Filters may be of various types, including user-selected filters from a gallery of filters presented to a sending user by the client application 104 when the sending user is composing a message. Other types of filters include geolocation filters (also known as geo-filters) which may be presented to a sending user based on geographic location. For example, geolocation filters specific to a neighborhood or special location may be presented within a user interface by the client application 104, based on geolocation information determined by a GPS unit of a client device 102. Another type of filter is a data filter, which may be selectively presented to a sending user by the client application 104, based on other inputs or information gathered by a client device 102 during the message creation process. Examples of data filters include current temperature at a specific location, a current speed at which a sending user is traveling, battery life for a client device 102, or the current time.

Other annotation data that may be stored within the image table 212 are augmented reality content items (e.g., corresponding to applying Lenses or augmented reality experiences). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. For example, some implementations may involve generating a three-dimensional mesh model of the object or objects, and using transformations and animated textures of the model within the video to achieve the transformation. In other implementations, tracking of points on an object may be used to place an image or texture (which may be two dimensional or three dimensional) at the tracked position. In still further implementations, neural network analysis of video frames may be used to place images, models, or textures in content (e.g., images or frames of video) Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some implementations, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more implementations, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some implementations of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other implementations, other methods and algorithms suitable for face detection can be used. For example, in some implementations, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some implementations, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some implementations, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Implementations of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example implementations, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some implementations, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some implementations, the graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified or such modifications may be individually toggled by tapping or selecting the individual face or a series of individual faces displayed within the graphical user interface.

As mentioned above, the video table 210 stores video data which, in one or more implementations, is associated with messages for which records are maintained within the message table 202. Similarly, the image table 212 stores image data associated with messages for which message data is stored in the entity table 204. The entity table 204 may associate various annotations from the annotation table 208 with various images and videos stored in the image table 212 and the video table 210.

A story table 214 stores data regarding collections of messages and associated image, video, or audio data, which are compiled into a collection (e.g., a story or a gallery). The creation of a particular collection may be initiated by a particular user (e.g., each user for which a record is maintained in the entity table 204). A user may create a "personal story" in the form of a collection of content that has been created and sent/broadcast b that user. To this end, one or more user interfaces generated by the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a user interface of the client application 104, to contribute content to a particular live story. The live story may be identified to the user by the client application 104, based on a user location. The end result is a "live story" told from a community perspective.

A further type of content collection is known as a "location story", which enables a user whose client device 102 is located within a specific geographic location (e.g., on a college or university campus) to contribute to a particular collection. In some implementations, a contribution to a location story may require a second degree of authentication to verify that the end user belongs to a specific organization or other entity (e.g., is a student on the university campus).

The database(s) 118 may also store content classification data 216 that indicates classifications of content items produced by the client application 104. For example, the content classification data 216 may include one or more identifiers of respective classifications of content items. In one or more examples, the content classification data 216 may include one or more lists of classification identifiers that may be applied to respective content items. In various implementations, the content classification data 216 may indicate a number of content items that are associated with a respective content identifier. For example, the content classification data 216 may indicate a first number of content items that are associated with a first content identifier (e.g., "keto diet") and a second number of content items that are associated with a second content identifier (e.g., "plant-based diet"). Additionally, the content classification data 216 may indicate one or more classification identifiers that are associated with respective content items. To illustrate, the content classification data 216 may indicate a first content item that is associated with one or more first content identifiers and a second content item that is associated with one or more second content identifiers. In one or more illustrative examples, at least one first content identifier of the one or more first content identifiers may be different from at least one second content identifier of the one or more second content identifiers.

Figure 3:
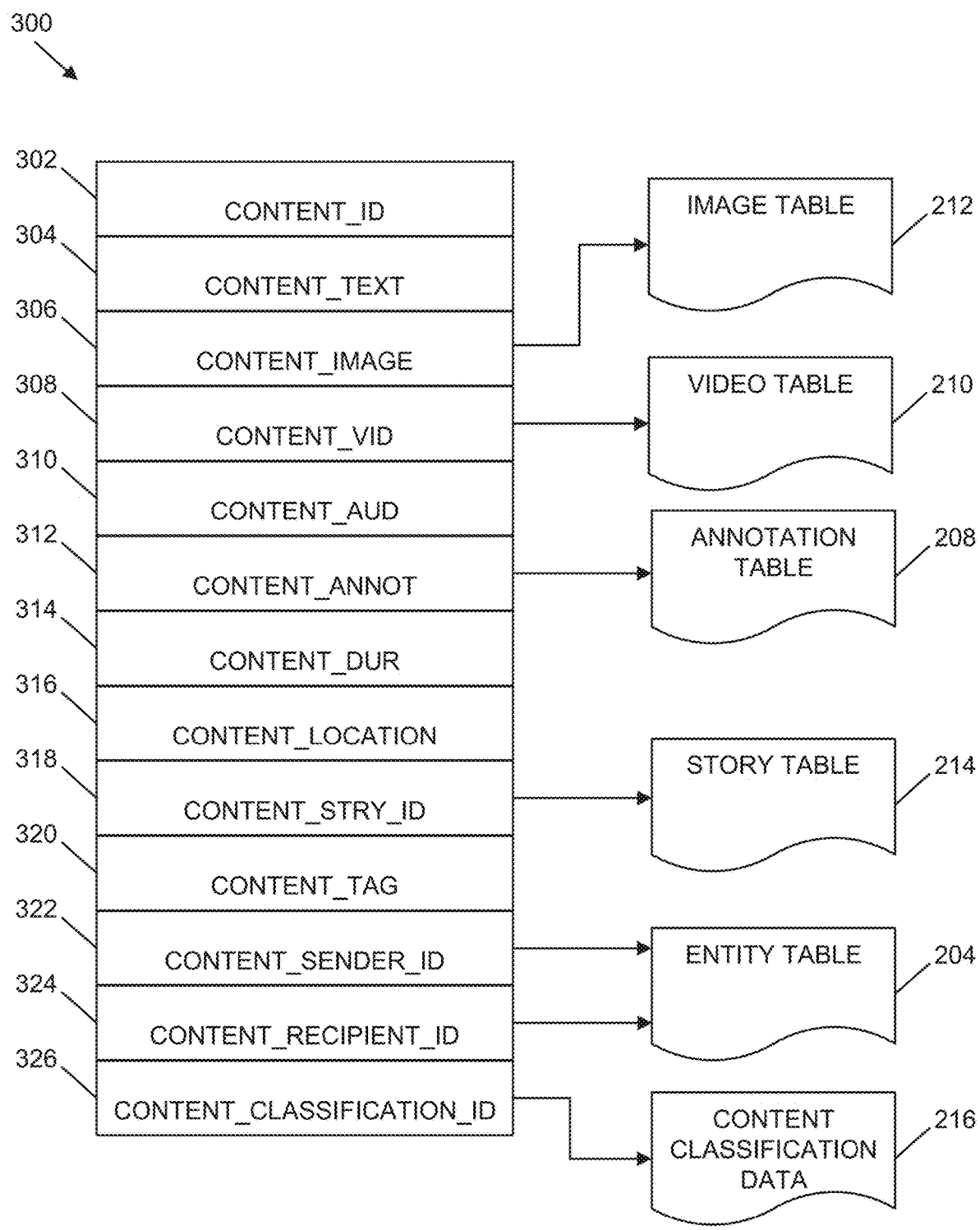
FIG. 3 is a schematic diagram illustrating an example framework for content that may be generated by a client application, in accordance with one or more example implementations.

FIG. 3 is a schematic diagram illustrating an example framework for content 300, according to some implementations. The content 300 may be generated by the client application 104. In various examples, the content 300 may be generated by a first instance of the client application 104 and communicated to at least one of a second instance of the client application 104 or the server system 108. In situations where the content 300 includes a message, the content 300 may be used to populate the message table 202 stored within the database(s) 118 and accessible by the application server 114. In one or more implementations, the content 300 may be stored in memory as "in-transit" or "in-flight" data of at least one of client devices 102 or the application server 114. The content 300 is shown to include the following components:

- A content identifier 302: a unique identifier that identifies the content 300.
- A content text payload 304: text, to be generated by a user via a user interface of the client application 104 and that may be included in the content 300.
- A content image payload 306: image data, captured by a camera component of a client device 102 or retrieved from a memory component of a client device 102, and that is included in the content 300.
- A content video payload 308: video data, captured by a camera component or retrieved from a memory component of a client device 102, and that is included in the content 300.
- A content audio payload 310: audio data, captured by a microphone or retrieved from a memory component of a client device 102, and that is included in the content 300.
- Content annotations 312: annotation data (e.g., filters, stickers, overlays, or other enhancements) that represents annotations to be applied to content image payload 306, content video payload 308, or content audio payload 310 of the content 300.
- A content duration parameter 314: parameter value indicating, in seconds, the amount of time for which the content 300 (e.g., the content image payload 306, content video payload 308, content audio payload 310) is to be presented or made accessible to a user via the client application 104.
- A content geolocation parameter 316: geolocation data (e.g., latitudinal and longitudinal coordinates) associated with the payload of the content 300. Multiple values of the geolocation parameter 316 may be included in the payload with each of the values of the geolocation parameter 316 being associated with respect to content items included in the content 300 (e.g., a specific image within the content image payload 306, or a specific video in the content video payload 308).
- A content story identifier 318: identifier values identifying one or more content collections (e.g., "stories") with which a particular content item in the content image payload 306 of the content 300 is associated. For example, multiple images within the content image payload 306 may each be associated with multiple content collections using identifier values.
- A content tag 320: content 300 may be tagged with multiple tags, each of which is indicative of the subject matter of one or more content items included in the payload of the content 300. For example, where a particular image included in the content image payload 306 depicts an animal (e.g., a lion), a tag value may be included within the content tag 320 that is indicative of the relevant animal. Tag values may be generated manually, based on user input, or may be automatically generated using, for example, image recognition.
- A content sender identifier 322: an identifier (e.g., a system identifier, email address, or device identifier) indicative of a user of a client device 102 on which the content 300 was generated and from which the content 300 was generated or sent.
- A content recipient identifier 324: an identifier (e.g., a system identifier, email address, or device identifier) indicative of a user of another client device 102 to which the content 300 is addressed or otherwise accessible.
- A content classification identifier 326: an identifier of a classification of a content item included in the content 300. The content item classification identifier 326 may be one of a plurality of classification identifiers associated with the content 300. In one or more illustrative examples, the content classification identifier 326 may correspond to one or more alphanumeric characters or symbols.

The data (e.g., values) of the various components of content 300 may correspond to pointers to locations in tables within which the data is stored. For example, an image value in the content image payload 306 may be a pointer to (or address of) a location within an image table 212. Similarly, values within the content video payload 308 may point to data stored within a video table 210, values stored within the annotations 312 may point to data stored in an annotation table 208, values stored within the content story identifier 318 may point to data stored in a story table 214, and values stored within the content sender identifier 322 and the content recipient identifier 324 may point to user records stored within an entity table 204. Further, values of the content classification identifier 326 may point to data stored within a data structure that includes content classification data 216.

Figure 4:
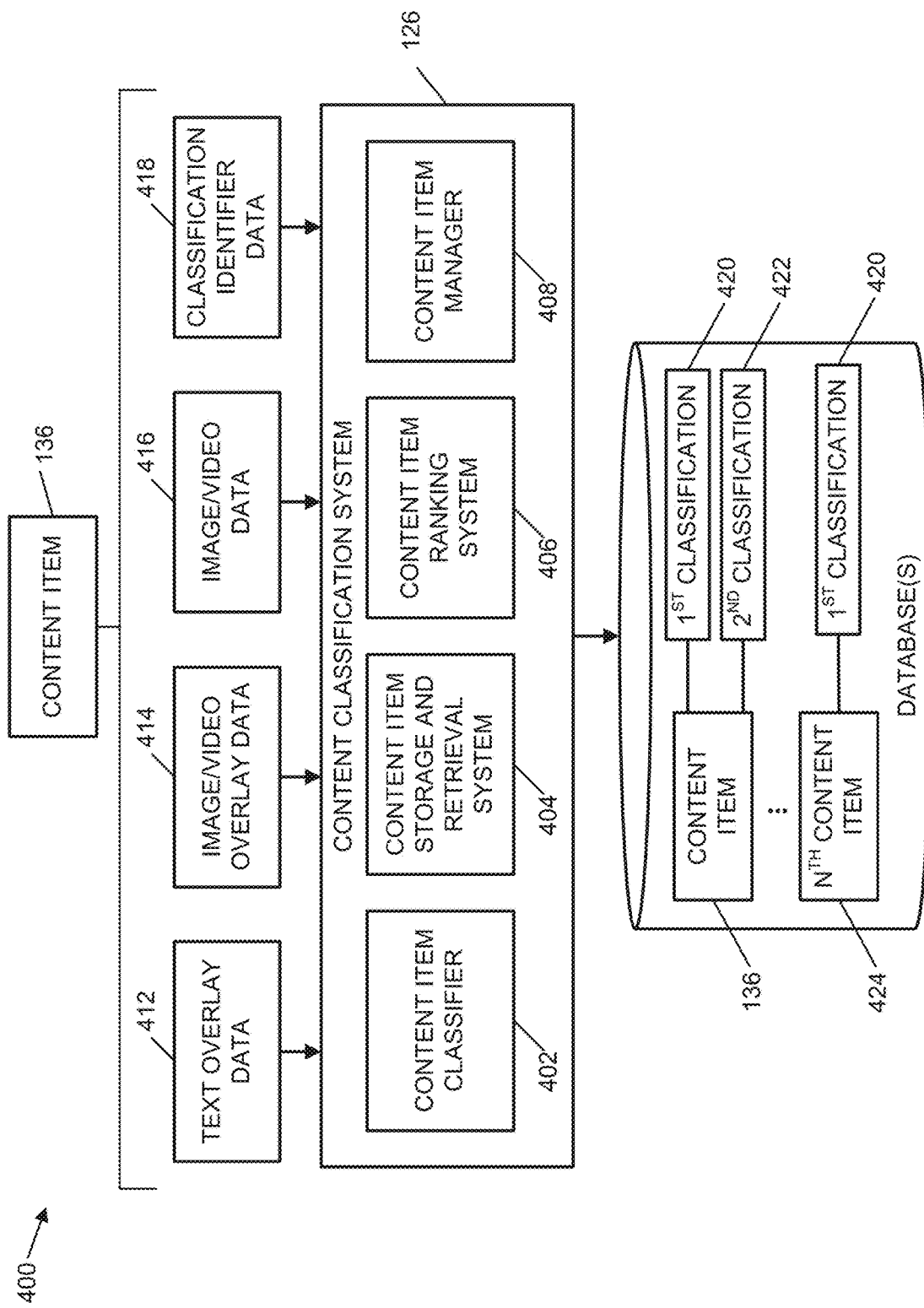
FIG. 4 is a diagrammatic representation illustrating an architecture that may determine classifications for content items and make content items accessible to users based on content item classifications, in accordance with one or more example implementations.

FIG. 4 is a diagrammatic representation illustrating an architecture 400 that may determine classifications for content items and make content items accessible to users based on content item classifications. The architecture 400 includes the content classification system 126. The content classification system 126 includes a content item classifier 402, a content item storage and retrieval system 404, a content item ranking system 406, and a content item manager 408.

The content item classifier 402 may analyze the data related to the content item 136 to determine one or more classifications for the content item 136. The data related to the content item 136 may be obtained by the content classification system 126 from an instance of the client application 104 executed by the client device 102. The data analyzed by the content item classifier 402 with respect to the content item 136 may include at least one of text overlay data 412, image or video overlay data 414, image or video data 416, or classification identifier data 418. In various examples, at least a portion of the classifications determined by the content item classifier 402 with respect to the content item 136 may be recommendations for classifications of the content item 136. Recommendations for classifications of the content item 136 may be accepted or rejected by a user of the client application 104 based on input obtained via one or more user interfaces displayed in conjunction with the client application 104.

The text overlay data 412 may correspond to data related to text content that overlays image content or video content of the content item 136. The text overlay data 412 may indicate one or more alphanumeric characters, one or more symbols, or combinations thereof, that are included in text that overlays at least one of the image content or video content of the content item 136. In one or more examples, the text overlay data 412 may indicate one or more identifiers of one or more classifications. For example, the text overlay data 412 may indicate at least one of words, letters, or symbols that correspond to one or more classification identifiers. In one or more illustrative examples, the text overlay data 412 may include a symbol indicating an identifier of a classification for content, such as a "#".

In various examples, the content item classifier 402 may analyze text of the text overlay data 412 to determine at least one of letters, words, or symbols related to at least one text overlay of the content item 136. In various examples, the content item classifier 402 may implement one or more natural language processing techniques to determine at least one of letters, words, or symbols of a text overlay. The content item classifier 402 may then determine a level of similarity between at least a portion of the text included in a text overlay of the content item 136 and at least one of letters, words, or symbols of a plurality of identifiers of classifications. The level of similarity may indicate a number of at least one of letters, words, or symbols of the text overlay of the content item 136 that correspond to a number of letters, words, symbols, or combinations thereof, of at least one classification identifier. The level of similarity may also correspond to an order in which groups of letters, words, symbols, or combinations thereof, appear in a text overlay of the content item 136 with respect to groups of at least one of letters, words, or symbols of classification identifiers. A level of similarity between text of an overlay of the content item 136 and a classification identifier may increase as the number of words, letters, symbols, or combinations thereof, of text of an overlay of the content item 136 increases that are in common with and have an order that corresponds to words, letters, symbols, or combinations thereof, of a classification identifier. Based on a level of similarity between text included in an overlay of the content item 136 and text of classification identifiers, the content item classifier 402 may determine one or more classifications to associate with the content item 136. In one or more illustrative examples, the content item classifier 402 may determine that at least a portion of a text overlay of the content item 136 corresponds to a classification identifier based on a level of similarity between the classification identifier and the at least a portion of the text overlay is greater than a threshold level of similarity. In additional examples, the content item classifier 402 may determine one or more classification identifiers having relatively high levels of similarity with at least a portion of a text overlay of the content item 136 in relation to other classification identifiers and determine that the classification(s) corresponding to the one or more classification identifiers are associated with the content item 136.

The content item classifier 402 may also analyze image or video overlay data 414 of the content item 136 to determine one or more classifications for the content item 136. An image overlay may include at least a portion of an image captured using a camera device. The image overlay may be related to an image captured by a user of the client application 104 that also produced the content item 136 using the client application 104. In additional examples, the image overlay may be obtained from an additional user of the client application 104 or from a service provider that produces images that may be used as overlays for content items produced using the client application 104. Further, the image overlay may be produced by at least one user of the client application 104 or a service provider using one or more creative tools of the client application 104. For example, at least one of one or more drawing tools or one or more painting tools may be used to create an image overlay for the content item 136. A video overlay may include video captured by one or more users of the client application 104 using a camera device. Additionally, a video overlay may include video produced by a service provider that generates video overlays for content items. In one or more implementations, a video overlay may include animated content.

In various examples, the image or video overlay data 414 may indicate an identifier of at least one of an image overlay or a video overlay of the content item 136. The identifier of at least one of an image overlay or a video overlay may correspond to a creative tool that is used to generate the at least one of the image overlay or the video overlay. Additionally, an identifier of an image overlay or a video overlay may be assigned by a creator of the overlay, such as a user of the client application 104 or a service provider that produces at least one of image overlays or video overlays for content items. In scenarios where the image or video overlay data includes an identifier that corresponds to the image overlay or video overlay, the content item classifier 402 may determine a classification of the content item based on the identifier of the overlay.

Additionally, the content item classifier 402 may analyze the image or video overlay data to determine one or more characteristics of an image or video overlay of the content item 136. The one or more characteristics may include one or more objects included in an image overlay or a video overlay, one or more locations of an image overlay or a video overlay, one or more individuals included in an image overlay or a video overlay, or one or more combinations thereof. In one or more illustrative examples, the content item classifier 402 may implement object recognition techniques to determine at least one of objects or individuals included in at least one of an image overlay or a video overlay of the content item 136. In one or more implementations, the content item classifier 402 may implement one or more machine learning techniques to identify at least one of objects or individuals included in an image overlay or a video overlay of the content item 136. In various examples, the content item classifier 402 may analyze one or more template images stored by the database(s) 118 to determine at least one of one or more objects or one or more individuals included in an image overlay or a video overlay of the content item 136.

The content item classifier 402 may determine at least one classification for the content item 136 based on one or more characteristics of an image overlay or a video overlay of the content item 136. For example, the content item classifier 402 may determine one or more keywords related to a characteristic of an image overlay or a video overlay and analyze the one or more keywords related to the characteristic with respect to one or more classification identifiers. In various implementations, one or more keywords related to a respective object, an individual, or a location may be stored by the database(s) 118 and used by the content item classifier 402 to determine a classification of the content item 136. In one or more illustrative examples, the content item classifier 402 may determine one or more keywords related to at least one of an object, an individual, or a location of an image overlay or a video overlay of the content item 136 and determine a level of similarity between the one or more keywords and one or more classification identifiers. Based on the levels of similarity with respect to one or more threshold levels of similarity or with respect to a ranking of the levels of similarity, the content item classifier 402 may determine at least one classification identifier that corresponds to the content item 136 in relation to at least one of an image overlay or a video overlay for the content item 136.

Further, the content item classifier 402 may determine one or more classifications for the content item 136 based on at least one of image data or video data 416 of the content item 136. In one or more examples, the content item 136 may comprise one or more images, one or more videos, or both one or more images and one or more videos. For example, a user of the client application 104 may capture at least one of one or more images or one or more videos using a camera device of a client device 102 and use the client application 104 to generate the content item 136 such that the content item 136 includes the one or more images or the one or more videos. In a manner similar to that described previously with respect to the image or video overlay data 414, the content item classifier 402 may analyze at least one of one or more images or one or more videos included in the content item 136 to determine one or more objects, one or more individuals, one or more locations, or one or more combinations thereof included in at least one of one or more images or one or more videos included in the content item 136. For example, the content item classifier 402 may implement one or more object recognition techniques to determine at least one of one or more objects or one or more individuals included in at least one of one or more images or one or more videos of the content item 136. The content item classifier 402 may then determine one or more keywords corresponding to an object or individual included in an image or video of the content item 136 and analyze the one or more keywords in relation to identifiers of classifications for content items. Based on the analysis, such as a similarity analysis, the content item classifier 402 may determine one or more classifications for the content item 136 according to one or more characteristics of at least one of images or videos of the content item 136.

The content item classifier 402 may also analyze classification identifier data 418 of the content item 136 to determine one or more classifications for the content item 136. For example, when the content item 136 is being generated using the client application 104, the client application 104 may associate one or more classification identifiers with the content item 136. In various examples, an instance of a client application 104 executed by a client device 102 may implement at least a portion of the operations performed by the content item classifier 402 to determine one or more classifications of the content item 136 and assign identifiers of the one or more classifications to the content item 136. To illustrate, the client application 104 may analyze at least one of text overlay data 412, image or video overlay data 414, or image or video data 416 to determine one or more classifications of the content item 136. The client application 104 may send identifiers of the one or more classifications of the content item 136 to the content classification system 126 as classification identifier data 418. Further, the classification identifier data 418 may include identifiers of classifications selected by a user of the client application 104. In one or more illustrative examples, the client application 104 may cause one or more user interfaces to be displayed that may include user interface elements that are selectable to associate a classification to the content item 136. The one or more user interfaces may include a list of classifications that may be selectable for the content item 136. In one or more examples, the one or more user interfaces may include one or more recommendations for classifications of the content item 136. Selection of a user interface element corresponding to a classification identifier may cause the client application 104 to associate a corresponding classification with the content item 136. In these scenarios, the classification identifier data 418 may indicate one or more identifiers of at least one classification selected by a user of the client application 104 for the content item 136.

After determining one or more classifications for the content item 136, the content item classifier 402 may operate in conjunction with the content item storage and retrieval system 404 to store data related to the content item 136 in the database(s) 118 in association with the one or more classifications. For example, the content item classifier 402 may determine that a first classification 420 and a second classification 422 correspond to the content item 136. The content item storage and retrieval system 404 may store the content item 136 in the database(s) 118 in association with the first classification 420 and the second classification 422. In various examples, the content item 136 may be stored in a data structure indicating that the content item 136 corresponds to the first classification 420 and the second classification 422. In one or more illustrative examples, the content item 136 may be stored in a database table that includes one or more fields corresponding to classifications associated with the content item 136, such as the first classification 420 and the second classification 422. The database(s) 118 may store data related to a number of additional content items up to an Nth content item 424 that is associated with one or more classifications, such as the first classification 420.

In one or more implementations, the content item storage and retrieval system 404 may retrieve data corresponding to content items based on requests received from client devices 102 executing instances of the client application 104. In various examples, the content item storage and retrieval system 404 may retrieve data related to content items stored by the database(s) 118 responsive to requests for content related to one or more classification identifiers. For example, the server system 108 may receive a request from a client device 102 executing an instance of the client application 104 for content related to a respective classification identifier, such as "spring flowers". In one or more examples, the classification identifier may be entered by a user of the client application 104 into one or more user interface elements generated by the client application 104. In additional examples, the classification identifier may be selected by a user of the client application 104 via selection of a user interface element corresponding to the classification identifier that is displayed in a user interface generated by the client application 104.

In response to receiving a request for content related to one or more classifications, the content item storage and retrieval system 404 may obtain content item data from the database(s) 118 that are stored in association with the one or more classifications. In various examples, the content item storage and retrieval system 404 may query the database(s) 118 to retrieve one or more content items that correspond to a classification identifier included in a request for content. In one or more illustrative examples, the server system 108 may obtain a request for content items corresponding to the first classification 420. The content item storage and retrieval system 404 may retrieve data corresponding to at least a portion of the content items related to the first classification 420, such as the content item 136 and the Nth content item 424.

In various implementations, the content item ranking system 406 may determine rankings of content items that indicate a level of interest of the content items to one or more users of the client application 104. In one or more examples, the content item ranking system 406 may analyze one or more characteristics of a number of content items in relation to characteristics of a user of the client application 104 to determine a respective ranking for an individual content item with respect to other content items. To illustrate, the content item ranking system 406 may analyze profile information of a user of the client application 104, account information of the user, content viewed by the user, an amount of time a user views one or more content items, location of the user, classifications of content viewed by the user, characteristics of additional users of the client application 104 that the user is following, characteristics of additional users of the client application 104 that are following the user, one or more combinations thereof and the like, to determine one or more characteristics of the user of the client application 104. Additionally, the content item ranking system 406 may analyze one or more classifications of content items, one or more locations related to content items, one or more objects related to content items, one or more individuals included in the content items, characteristics of users of the client application 104 that created the content items, a number of times that content items have been viewed, an amount of time that content items have been viewed, characteristics of users of the client application 104 that viewed the content items, one or more combinations thereof, and so forth, to determine one or more characteristics of individual content items. Based on the characteristics of a user of the client application 104 and the characteristics of a number of content items, the content item ranking system 406 may determine a ranking for individual content items with respect to the user that indicates a level of interest of the user in viewing the respective content items. In one or more illustrative examples, the ranking of a respective content item for the user may correspond to an order in which the content item is presented to the user in a user interface of the client application 104. For example, a first content item having a first ranking that is higher than a second ranking of a second content item may be presented to the user in a user interface of the client application 104 before the second content item. In one or more implementations, the second ranking of the second content item may correspond to a level of interest that is less than a level of interest of the first content item.

The content item ranking system 406 may implement one or more computational techniques to determine rankings of content items with respect to one or more users of the client application 104. For example, the content item ranking system 406 may implement one or more statistical techniques to determine rankings of content items with respect to one or more users of the client application 104. In one or more illustrative examples, the content item ranking system 406 may implement one or more linear regression modeling techniques to determine rankings of content items for a user of the client application 104. Additionally, the content item ranking system 406 may implement one or more gradient descent techniques to determine rankings of content items with respect to a user of the client application 104. Further, the content item ranking system 406 may implement one or more machine learning techniques to determine rankings of content items for a user of the client application 104. To illustrate, the content item ranking system 406 may implement one or more neural networks, such as one or more convolutional neural networks, to determine rankings for content items with respect to a user of the client application 104. In one or more examples, one or more neural networks may be implemented by the content item ranking system 406 to determine characteristics of users of the client application 104 that may indicate at least a threshold level of interest in one or more content items associated with a content item classification.

In one or more implementations, the content item storage and retrieval system 404 may operate in conjunction with the content item ranking system 406 to provide content items in response to requests for content related to a given classification. For example, the content item ranking system 406 may determine rankings for individual content items retrieved by the content item storage and retrieval system 404 in response to a request for content related to one or more classifications. To illustrate, in response to a request for content related to the first classification 420, the content item storage and retrieval system 404 may obtain at least a portion of the content items stored by the database(s) 118 that correspond to the first classification 420. The content item ranking system 406 may then determine rankings for the content items retrieved by the content item storage and retrieval system 404. In various examples, the content item ranking system 406 may determine rankings for a number of content items based on one or more characteristics of a user requesting the content having a respective classification. In this way, the content item storage and retrieval system 404 and the content item ranking system 406 may operate to provide a number of content items in response to a request by a user of the client application 104 for content related to a classification that may be of more interest to the user than other content items having the classification. Accordingly, ranking content items having a classification for individual users of the client application 104 may be used to customize the presentation of content items for the user based on a level of interest for a respective user in content items associated with the classification.

The content item manager 408 may enable users of the client application 104 to at least one of view, organize, share, or manage content items generated using the client application 104 that have been associated with a classification. For example, the content item manager 408 may operate in conjunction with the content item storage and retrieval system 404 to provide content items generated by a user of the client application 104 having one or more classifications to a client device 102 of the user. To illustrate, the content item manager 408 may receive a request to view content items created by the user having one or more classifications where the request is sent in response to one or more inputs provided via one or more user interfaces displayed by the client application 104. The content item manager 408 may then cause data corresponding to the content items of the user corresponding to the request to be sent to the client device 102 of the user for display by the client application 104. The content item manager 408 may also cause content items to be added to at least one of an account or profile of a user of the client application 104 or deleted from at least one of an account or profile of the user based on input obtained by the content item manager 408 via the client application 104.

In various examples, the content item manager 408 may provide content items to a client device 102 of a user of the client application 104 such that the content items of the user that are associated with one or more classifications are displayed in one or more pages of the client application 104 that are dedicated to displaying content items of the user having one or more classifications. In one or more illustrative examples, content items created by the user that are not associated with at least one classification may not be displayed in the one or more pages. In one or more implementations, the content items created by a user of the client application 104 that are associated with at least one classification determined by the content classification system 126 may be publicly accessible to other users of the client application 104 and content items created by the user that are not associated with a classification determined by the content classification system 126 may have limited accessibility to users of the client application 104. To illustrate, content items that are not associated with a particular classification identifier may be limited to access by recipients of the content items as specified by the user creating the content items.

Figure 5:
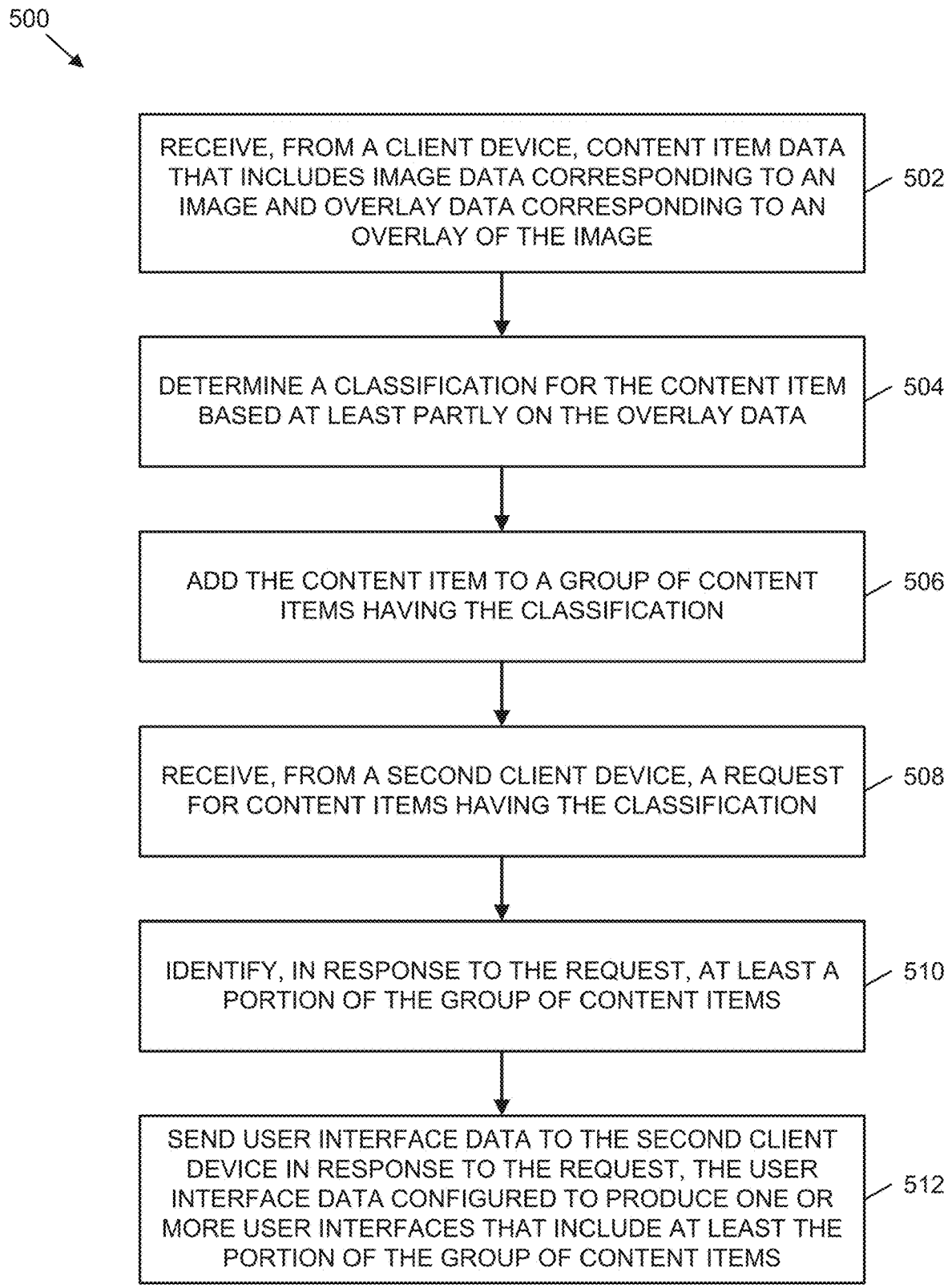
FIG. 5 is a flowchart illustrating example operations performed by a server system for content item classification based on data corresponding to overlays of content items, according to one or more example implementations
Figure 6:
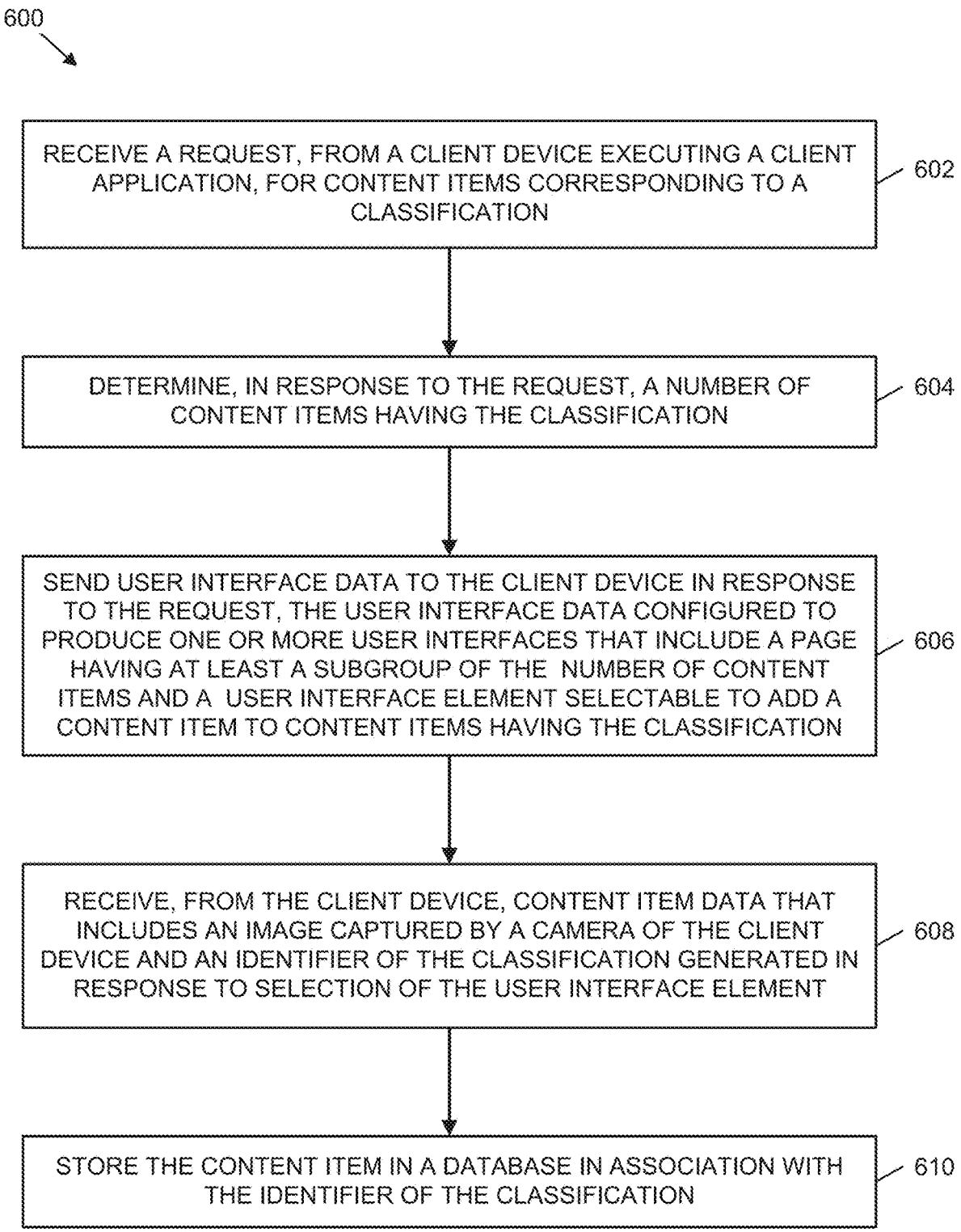
FIG. 6 is a flowchart illustrating example operations performed by a server system to add content to a classification from a page displaying content items associated with the classification, according to one or more example implementations.
Figure 7:
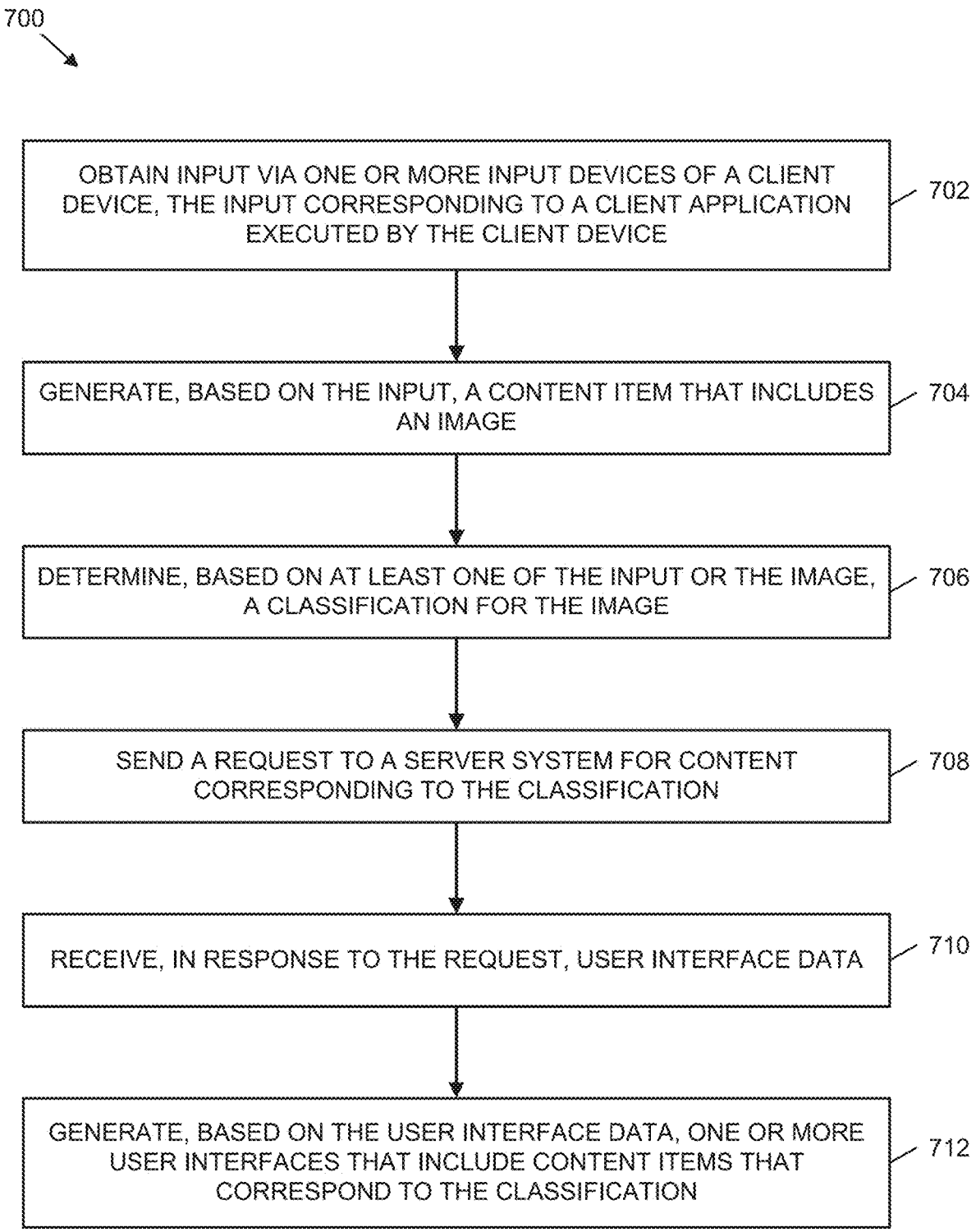
FIG. 7 is a flowchart illustrating example operations performed by a client device to generate content items that are accessible based on classification, according to one or more example implementations.

FIGS. 5-7 illustrate flowcharts of processes to classify and discover content created using a client application 104. The processes may be embodied in computer-readable instructions for execution by one or more processors such that the operations of the processes may be performed in part or in whole by the functional components of the at least one of the client application 104 or the server system 108. Accordingly, the processes described below are by way of example with reference thereto, in some situations. However, in other implementations, at least some of the operations of the processes described with respect to FIGS. 5-7 may be deployed on various other hardware configurations. The processes described with respect to FIG. 5-7 are therefore not intended to be limited to the server system 108 or client device 102 and can be implemented in whole, or in part, by one or more additional components. Some or all of the operations of the processes described with respect to FIGS. 5-7 can be performed in parallel, out of order, or entirely omitted, in various implementations.

FIG. 5 is a flowchart illustrating example operations of a process 500 performed by a server system for content item classification based on data corresponding to overlays of content items, according to one or more example implementations. At operation 502, the process 500 includes receiving, from a client device, content item data. The content item data may be produced by an instance of a client application executed by the client device. In one or more implementations, the content item data may include image data corresponding to an image. The content item data may also include overlay data indicating an overlay of the image. In one or more examples, the image may be captured by at least one camera device of the client device in response to input of a user of the client device obtained via one or more user interfaces displayed by the client application. Additionally, the overlay may be produced by the input obtained from a user of the client application. The overlay may include text content that includes at least one of words, letter, symbols, or numbers that are related to the image. Further, the overlay may include content generated using one or more creative tools of the client application. To illustrate, the overlay may include artwork, drawings, illustrations, animations, or one or more combinations thereof, generated by a user of the client application.

The process 500 may also include, at operation 504, determining a classification for the content item based at least partly on the overlay data. The overlay data may be analyzed to identify classification identifiers that may be included in the overlay. In one or more examples, the overlay may include text data that indicates a classification identifier. Additionally, a classification of the overlay may be determined based on a creative tool used to produce the overlay. Further, a classification of the overlay may be determined based on an identifier of an overlay, such as a name of the overlay specified by a creator of the overlay. In various examples, the overlay may be associated with a location and a classification of the overlay may be determined based on the location.

In addition, at operation 506, the process 500 may include adding the content item to a group of content items having the classification. In one or more implementations, the content item may be stored in a database in association with the classification. In various examples, individual content items associated with the classification may be stored in association with an identifier of the classification. At operation 508, the process 500 may include receiving, from a second client device, a request for content items having the classification. For example, a request including an identifier of the classification may be received from an instance of the client application executed by the second client device.

The process 500 may include, at operation 510, identifying, in response to the request, at least a portion of the group of content items having the classification. In various examples, at least a portion of the group of content items having the classification may be retrieved from a database using an identifier of the classification. In one or more examples, the content items retrieved from the database having the classification may be ranked. The rankings for content items having the classification may be determined based on an analysis of characteristics of the content items having the classification in relation to characteristics of a user of the client application to determine content items having the classification that may have at least a threshold level of interest for the user. In one or more implementations, the ranking of a content item may be based at least partly on characteristics of a creator of the content item. To illustrate, creators of content items having a public profile with respect to the client application may be weighted in favor of relatively higher rankings than content items produced by creators that do not have public profiles in relation to the client application.

In additional implementations, a ranking of content items may be determined according to input provided by one or more representatives of a service provider that provides services in relation to the client application. For example, a representative of the service provider may indicate a level of interest of a content item with respect to one or more users of the client application. In these scenarios, a weighting of the content item with respect to other content items may be modified based on the input obtained from the representative of the service provider. In various examples, content items for which input is obtained from a representative of the service provider that indicates a relatively, high level of interest may be ranked more highly than content items for which input from a representative of the service provider is not obtained. Further, input from a representative of a service provider may also indicate a lower level of interest for users of the client application, such as in situations where the content item includes content that may be inappropriate for users of the client application. In these situations, the content item may be ranked lower than content items for which service provider representative input is not obtained.

At operation 512, the process 500 may include sending user interface data to the second client device in response to the request. The user interface data may be configured to produce one or more user interfaces that include at least the portion of the content items. In various examples, the one or more user interfaces may display a page of content items that is dedicated to the classification. In one or more implementations, the content items may be presented in the user interface in relation to rankings of the content items having the classification. For example, content items having a relatively higher ranking with respect to the user of the second client device may be presented at a top portion of a page displayed in the user interface. To access content items having relatively lower rankings, a user of the second client device may scroll down the page.

FIG. 6 is a flowchart illustrating example operations of a process 600 performed by a server system to add content to a classification from a page displaying content items associated with the classification, according to one or more example implementations. The process 600 includes, at operation 602, receiving, from a client device executing a client application, a request for a number of content items having a classification. The request may include at least one of one or more keywords corresponding to the classification or an identifier of the classification. At operation 604, in response to the request, a number of content items having the classification may be determined. The number of content items may be retrieved from a database storing content items according to respective classifications of the content items. In various examples, a query to the database that includes at least one of the one or more keywords or the identifier of the classification may be used to retrieve the content items from the database. Additionally, rankings may be determined for the number of content items having the classification that indicate a level of interest of respective content items in relation to a user of the client device making the request.

Further, at operation 606, the process 600 may include sending user interface data to the client device in response to the request. The user interface data may be configured to produce one or more user interfaces that include a page having at least a subgroup of the number of content items having the classification. In one or more examples, a subgroup of content items displayed in the page may have rankings that are higher than rankings of additional content items that are not included in the page. In addition, the one or more user interfaces may include a user interface element that is selectable to add a content item to content items having the classification. In one or more implementations, selection of the user interface element may cause at least one camera of the client device to become active. The at least one camera may be used to capture an image that is included in the content item. Further, due to the image being captured in relation to selection of the user interface element that is included in a page dedicated to content items having a respective classification, the classification may also be associated with the content item that includes the image.

At operation 608, the process 600 may include receiving, from the client device, content item data that includes the image captured by a camera of the client device. The content item data may also indicate an identifier of the classification. The process 600 may also include, at operation 610, storing the content item in a database in association with the identifier of the classification. In this way, the content item may be retrieved in association with the classification identifier in response to subsequent requests for content items having the classification. In one or more implementations, the content item may include an overlay that is produced using one or more creative tools of the client application.

FIG. 7 is a flowchart illustrating example operations of a process 700 performed by a client device to generate content items that are accessible based on respective classifications of the content items, according to one or more example implementations. The process 700 may include, at operation 702, obtaining input via one or more input devices of a client device. The input may be provided in conjunction with an instance of a client application that is executed by the client device. In various examples, the input may be directed to capturing an image using at least one camera of the client device. The image may be captured using one or more user interface elements that are displayed in at least one user interface of the client application. The input may also be directed to producing one or more annotations. In various examples, the annotations may be produced using one or more creative tools of the client application. Further, the input may be directed to selection of one or more classification identifiers.

At operation 704, the process 700 may include generating, based on the input, a content item that includes an image. In addition to the image, the content item may include one or more annotations related to the image. The one or more annotations may include at least one overlay that is displayed atop the image. The at least one overlay may include text content. In various examples, the at least one overlay may include content produced using the one or more creative tools of the client application. Further, at operation 706, the process 700 may include determining, based on at least one of the input or the image, a classification for the image. The classification of the image may be determined according to input indicating at least one identifier of the classification. In various examples, the classification may also be determined based on an overlay of the image. In one or more implementations, the classification may be determined according to at least one of objects or individuals included in the image.

The process 700 may include, at operation 708, sending a request to a server system for content corresponding to the classification. The request may include an identifier of the classification. In one or more examples, the request may be generated and sent in response to selection of a user interface element that is displayed in a user interface that includes a number of selectable user interface elements with each user interface element corresponding to a respective classification. Additionally, the process 700 may include, at operation 710, receiving, in response to the request, user interface data and, at operation 712, the process 700 may include generating, based on the user interface data, one or more user interfaces that include content items that correspond to the classification. In one or more illustrative examples, the one or more user interfaces may include a number of images that correspond to the content items. The content items may be ranked such that content items having a greater level of interest for a user of the client device may be displayed at a top of a page included in the one or more user interfaces with content items having a lower level of interest being displayed at a bottom of the page. In one or more implementations, the one or more user interfaces may include at least one content item created by a user of the client device.

Figure 8:
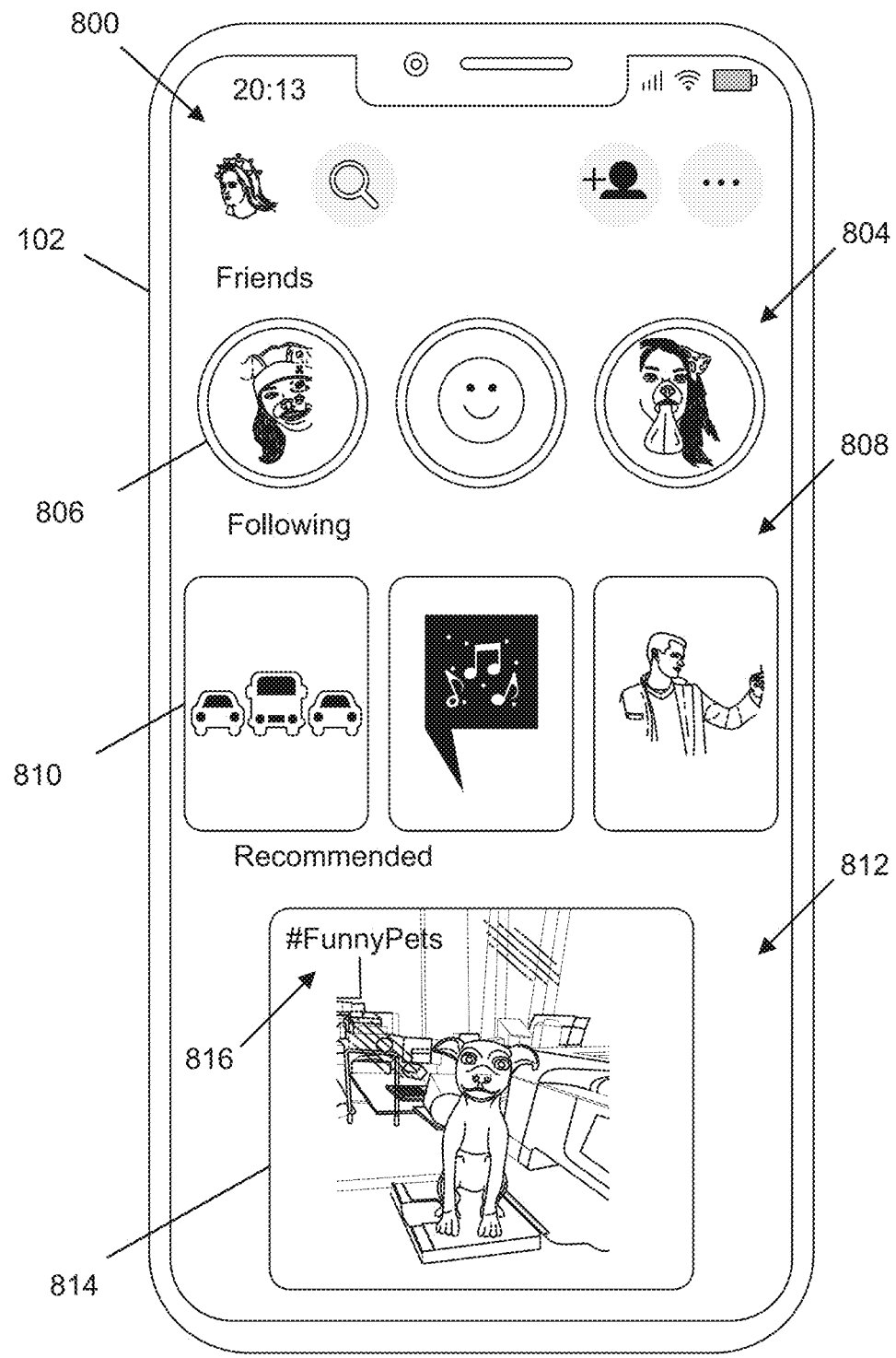
FIG. 8 is an illustration of a user interface that includes content associated with a classification, according to one or more example implementations.

FIG. 8 is an illustration of a user interface 800 that includes content associated with a classification, according to one or more example implementations. The user interface 800 may be displayed by a display device of a client device 102. In addition, the user interface 800 may be displayed in conjunction with a client application executed by the client device 102, such as the client application 104 described with respect to FIG. 1. The user interface 800 may include a first section 804 that includes user interface elements that are selectable to view content related to contacts of a user of a client application. For example, the first section 804 may include a first user interface element 806 that is selectable to view content related to a contact of the user. The content related to contacts of the user may include at least one of text content, image content, message content, video content, audio content, content produced by one or more creative tools, or annotation content.

The user interface 800 may also include a second section 808 that includes user interface elements that are selectable to access content related to one or more individuals, one or more groups of individuals, or one or more organizations that the user of the client device 102 is following using the client application. The user may be following an individual, group, or organization by subscribing to content that is produced by or otherwise published by the individual, group, or organization. In the illustrative example of FIG. 8, the second section 808 may include a second user interface element 810 that is selectable to view content related to an individual, group, or organization that corresponds to the second user interface element 810.

Additionally, the user interface 800 may include a third section 812 that includes one or more user interface elements that may be selectable to view content that is recommended for a user of the client device 102 in relation to the client application. In one or more examples, content included in the third section 812 may have a predicted level of interest for the user. The predicted level of interest may be determined by a server system based on an analysis of characteristics of the user in relation to characteristics of a number of content items. In one or more examples, the third section 812 may include a third user interface element 814 that is selectable to view content related to the image displayed by the third user interface element 814. In various examples, the third user interface element 814 may indicate an identifier 816 of a classification associated with content displayed by the third user interface element 814. In one or more implementations, the content included in the third section 812 may correspond to one or more classifications that are related to content produced by the user of the client application. To illustrate, a server system may determine that content having a classification that is the same or similar to a classification of content produced by the user may have at least a threshold level of interest for the user. In the illustrative example of FIG. 8, the user of the client application may have previously generated content that is related to the classification "FunnyPets". Accordingly, the server system may determine that additional content related to the classification "FunnyPets" may have at least a threshold level of interest for the user and include content items corresponding to the classification "FunnyPets" in the third section 812.

Figure 9:
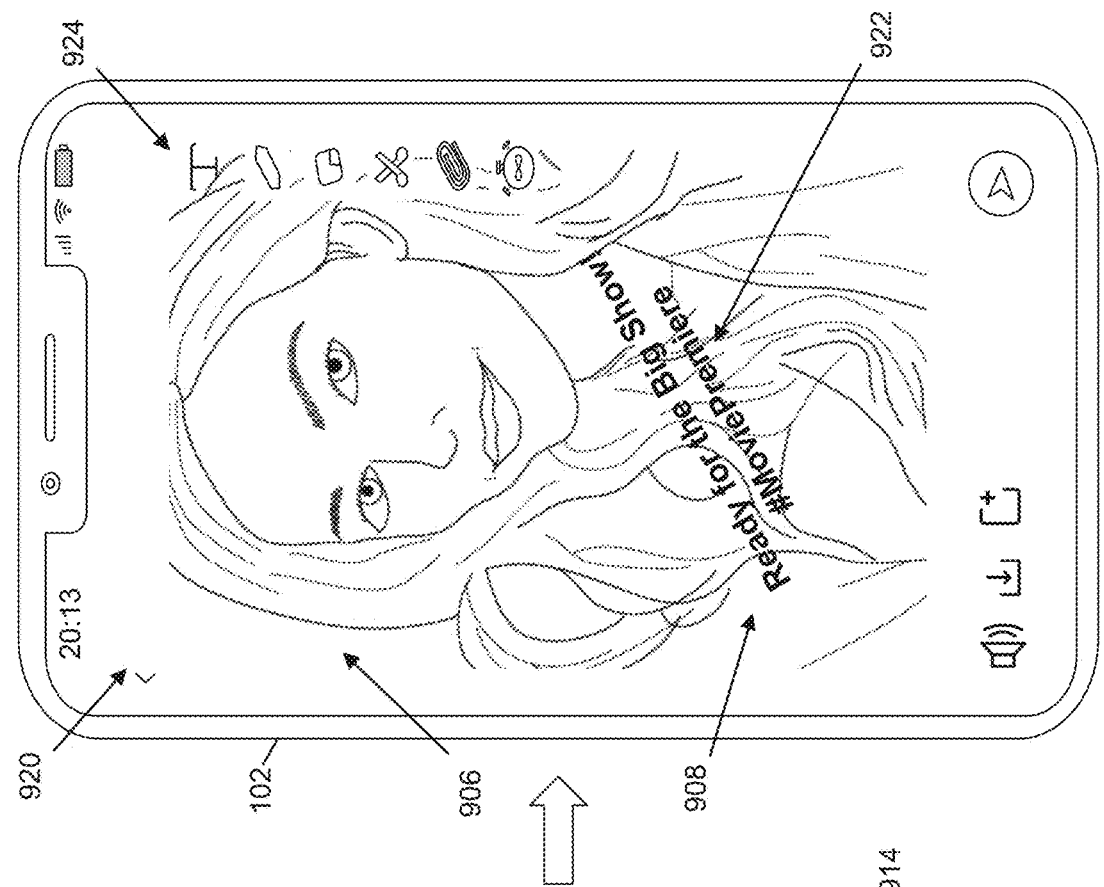
FIG. 9 is an illustration of a user interface to add a classification to content based on text input, according to one or more example implementations.
Figure 9:
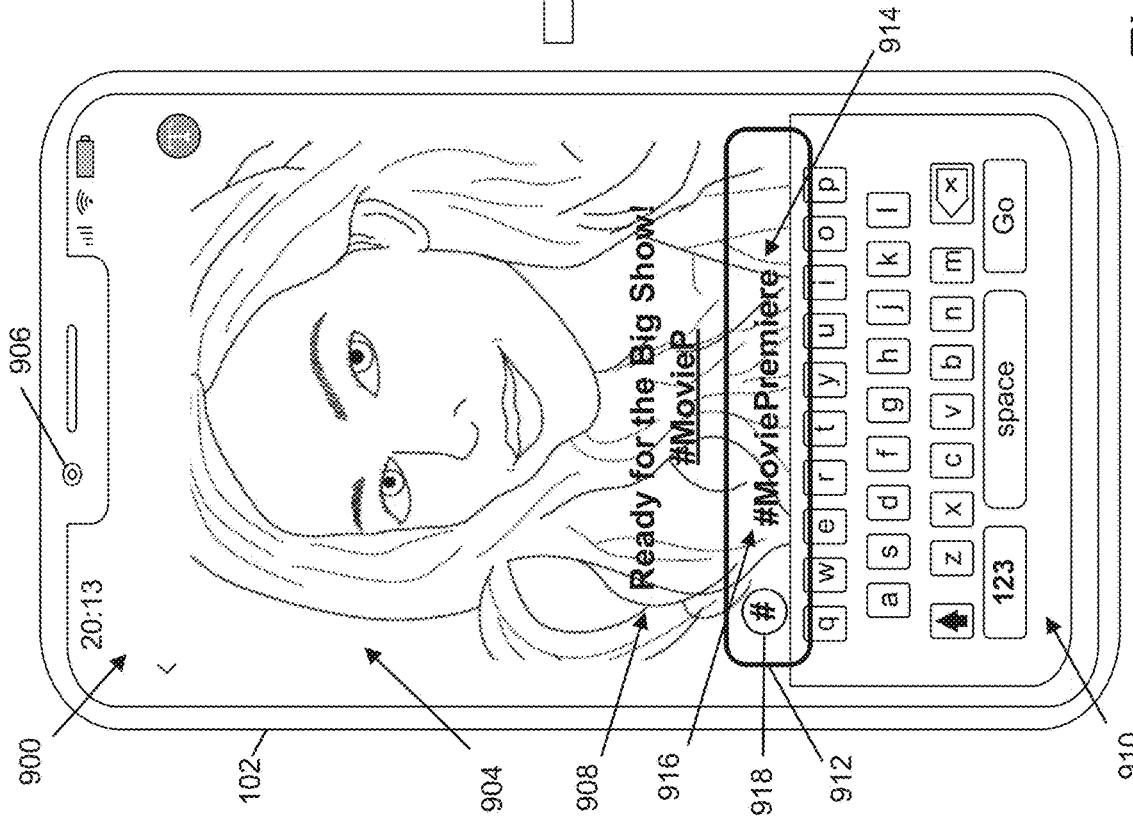

FIG. 9 is an illustration of a user interface 900 to add a classification to content based on text input, according to one or more example implementations. The user interface 900 may be displayed by a display device of a client device 102. In addition, the user interface 900 may be displayed in conjunction with a client application executed by the client device 102, such as the client application 104 described with respect to FIG. 1. The user interface 900 may include an image 904. The image 904 may have been captured using at least one camera of the client device 102, such as a camera 906. The user interface 900 may also include an overlay 908 displayed atop the image 904. In the illustrative example of FIG. 9, the overlay 908 includes text content. The text content of the overlay 908 may be entered via a keyboard input device 910 included in the user interface 900.

In various examples, the keyboard input device 910 may be used to enter an identifier of a classification that may be related to at least one of the image 904 or the overlay 908. For example, the user interface 900 may include a user interface element 912 that may display text 914 that is directed to a classification of at least one of the image 904 or the overlay 908. In one or more illustrative examples, the text 914 may include a symbol 916 that may indicate that the text 914 is related to a classification for at least one of the image 904 or the overlay 908. In one or more implementations, selection of an additional user interface element 918 may cause the user interface element 912 to be displayed such that a user of the client device 902 may enter at least one of the text 914 or the symbol 916 using the keyboard input device 910 to indicate an identifier of a classification for at least one of the image 904 or the overlay 908. FIG. 9 also includes an additional user interface element 920 corresponding to an additional version of the user interface 900 that includes a final version of the overlay 908 that includes an identifier 922 of a classification corresponding to at least one of the image 904 of the overlay 908. The final version of the overlay 908 may also include text in addition to the identifier 922. Further, the additional user interface 920 may include a number of user interface elements 924 that are selectable to activate one or more creative tools to generate one or more additional overlays for the image 904.

Figure 10:
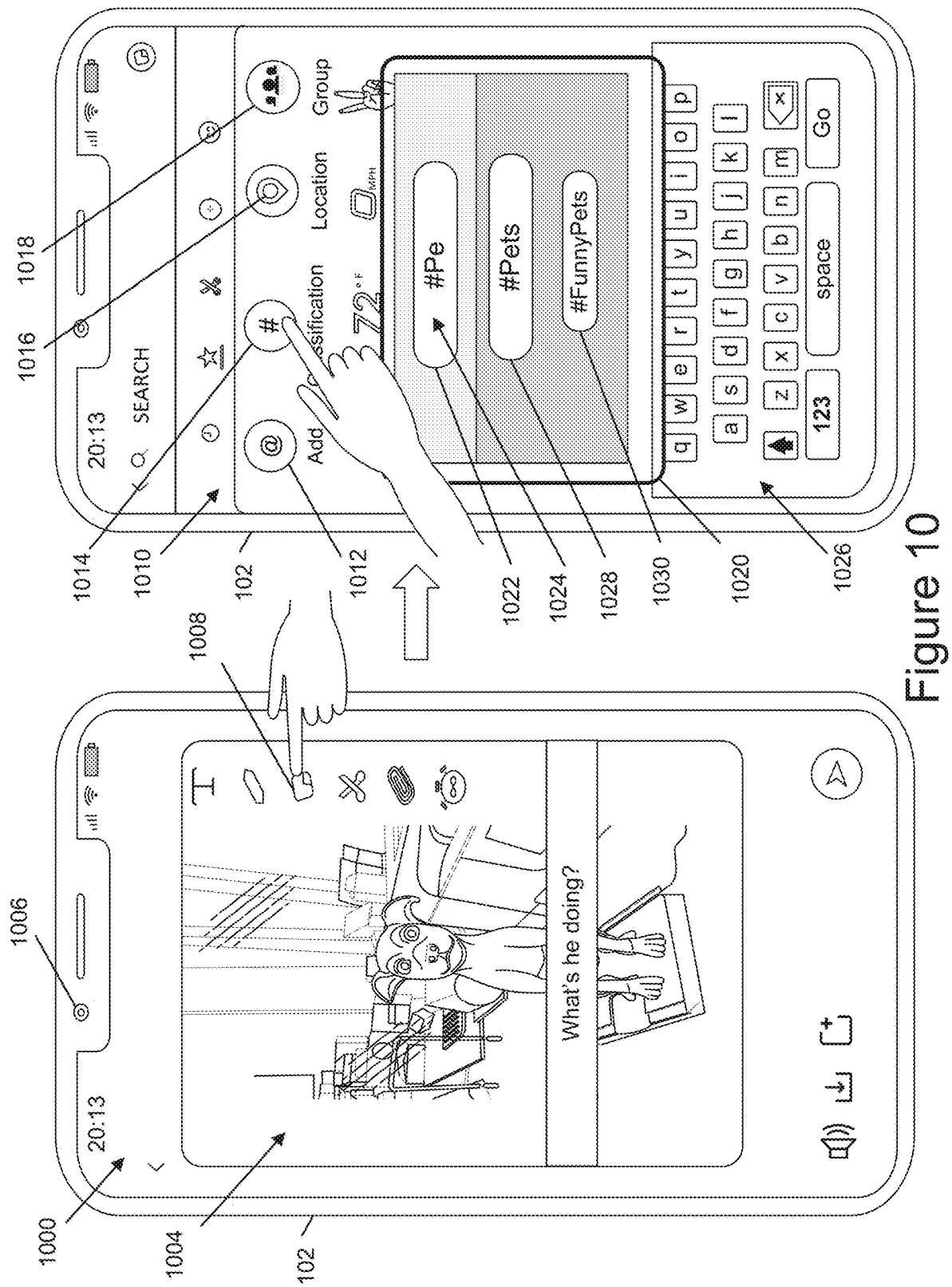
FIG. 10 is an illustration of a user interface to add a classification to content using a creative tool, according to one or more example implementations.

FIG. 10 is an illustration of a user interface 1000 to add a classification to content using a creative tool, according to one or more example implementations. The user interface 1000 may be displayed by a display device of a client device 102. In addition, the user interface 1000 may be displayed in conjunction with a client application executed by the client device 102, such as the client application 104 described with respect to FIG. 1. The user interface 1000 may include an image 1004. The image 1004 may have been captured using at least one camera of the client device 102, such as a camera 1006. The user interface 1000 may also include a number of user interface elements that may be selectable to perform one or more operations with respect to the image 1004. In various examples, the user interface 1000 may include one or more user interface elements to modify an appearance of the image 1004. For example, the user interface 1000 may include a user interface element 1008 to generate an overlay for the image 1004.

In one or more illustrative examples, selection of the user interface element 1008 may cause the client device 102 to generate an additional user interface 1010. The additional user interface 1010 may include a number of user interface elements that are selectable to add a number of different types of overlays with respect to the image 1004. To illustrate, the additional user interface 1010 may include a first user interface element 1012 that is selectable to mention an additional user within an overlay of the image 1004, such as by adding an identifier of the user as an overlay of the image 1004. The additional user interface 1010 may include a second user interface element 1014 that may be selectable to add a classification identifier as an overlay to the image 1004. Further, the additional user interface 1010 may include a third user interface element 1016 that is selectable to add an overlay to the image 1004 that indicates a location that may be related to the image 1004. Additionally, the additional user interface 1010 may include a fourth user interface element 1018 to add an overlay of the image 1004 that includes an identifier of a group.

In the illustrative example of FIG. 10, selection of the second user interface element 1014 may cause a first additional user interface element 1020 to be displayed. The first additional user interface element 1020 may include a second additional user interface element 1022 that may be used to capture text 1024 that corresponds to an identifier of a classification. The additional user interface 1010 may also include a touch input device keyboard 1026 that includes user interface elements that are selectable to add letters, numbers, symbols, or characters to the text 1024. In various examples, as letters, numbers, symbols, or characters are added to the text 1024 via the touch input device keyboard 1026, recommendations for identifiers for classifications may be displayed in the first additional user interface element 1020. For example, the first additional user interface element 1020 may include a third additional user interface element 1028 that includes a first recommendation for a classification identifier based at least partly on the text 1024 included in the second additional user interface element 1022. Further the first additional user interface element 1020 may include a fourth additional user interface element 1030 that includes a second recommendation for another classification identifier based at least partly on the text 1024 included in the second additional user interface element 1022.

Figure 11:
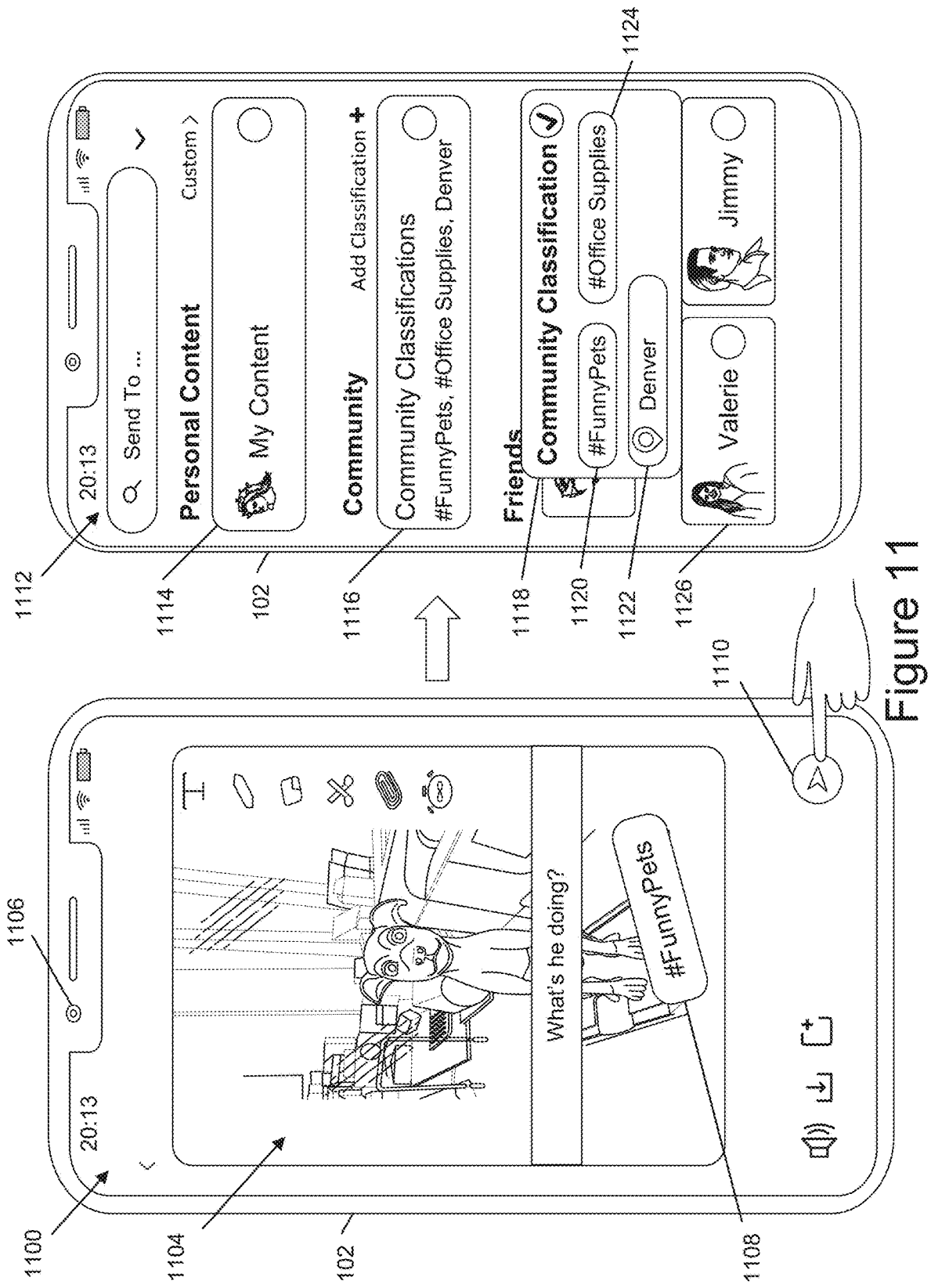
FIG. 11 is an illustration of a user interface to add a classification to content in relation to sharing the content, according to one or more example implementations.

FIG. 11 is an illustration of a user interface 1100 to add a classification to content in relation to sharing the content, according to one or more example implementations. The user interface 1100 may be displayed by a display device of a client device 102. In addition, the user interface 1100 may be displayed in conjunction with a client application executed by the client device 102, such as the client application 104 described with respect to FIG. 1. The user interface 1100 may include an image 1104. The image 1104 may have been captured using at least one camera of the client device 102, such as a camera 1106. The user interface 1100 may include an overlay 1108 that indicates an identifier of a classification of the image 1104. Further, the user interface 1100 may include a user interface element 1110 that is selectable to cause the client application 104 to generate an additional user interface 1112.

The additional user interface 1112 may include a number of user interface elements that are selectable to identify one or more recipients of a content item including the image 1104 and the overlay 1108. For example, the additional user interface 1112 may include a first additional user interface element 1114 to add the image 1104 and the overlay 1108 to a personal collection of the user that captured the image 1104 using the camera 1106. The additional user interface 1112 may also include a second additional user interface element 1116 that indicates a number of classifications that may correspond to the image 1104. Selection of the second additional user interface element 1116 may cause the image 1104 and the overlay 1108 to be associated with the classifications indicated by the second additional user interface element 1116.

In addition, the additional user interface 1112 may include a third additional user interface element 1118 that includes a fourth additional user interface element 1120, a fifth additional user interface element 1122, and a sixth additional user interface element 1124. The fourth additional user interface element 1120 may correspond to text of the overlay 1108. The fifth additional user interface element 1122 may correspond to a location associated with the image 1104 and the sixth additional user interface element 1124 may correspond to one or more objects included in the image 1104. Each of the additional user interface elements 1120, 1122, 1124 may be selectable to remove the corresponding classification from the second additional user interface element 1116. To illustrate, selection of the sixth additional user interface element 1124 may remove the classification "Office Supplies" from the second additional user interface element 1116. Further, the additional user interface 1112 may include at least a seventh additional user interface element 1126 that is selectable to share a content item including the image 1104 and the overlay 1108 with a contact of a user of the client device 102.

Figure 12:
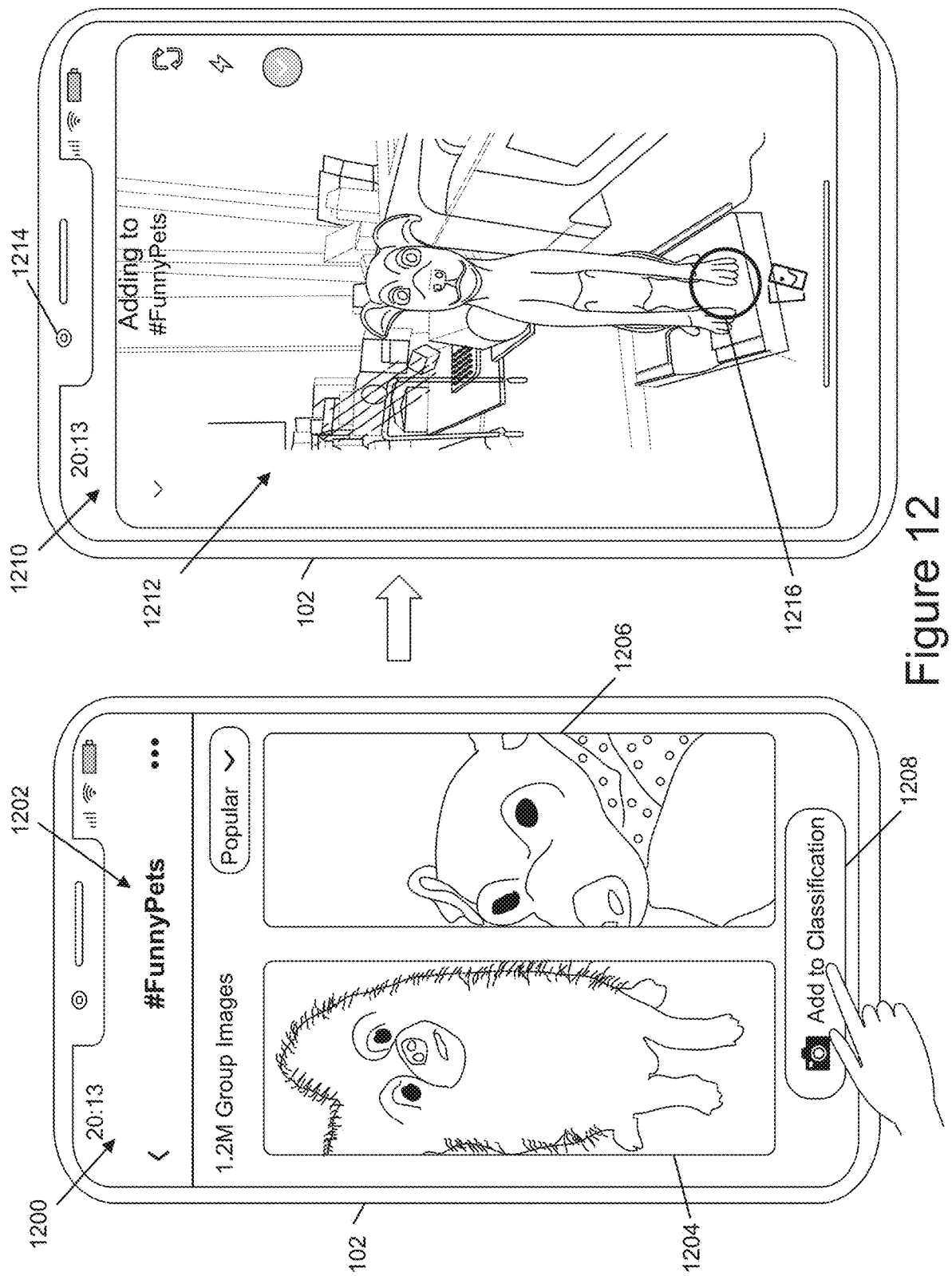
FIG. 12 is an illustration of a user interface to add content to a collection of content having a classification, according to one or more example implementations.

FIG. 12 is an illustration of a user interface 1200 to add content to a collection of content having a classification, according to one or more example implementations. The user interface 1200 may be displayed by a display device of a client device 102. In addition, the user interface 1200 may be displayed in conjunction with a client application executed by the client device 102, such as the client application 104 described with respect to FIG. 1. The user interface 1200 may include a number of user interface elements that correspond to content items associated with a classification 1202. For example, the user interface 1200 may include a first user interface element 1204 that corresponds to a first content item having the classification 1202 and a second user interface element 1206 that corresponds to a second content item having the classification 1202. In various examples, the first user interface element 1204 and the second user interface element 1206 may be selectable to cause the respective content item corresponding to the first user interface element 1202, 1204 to be displayed in a single page view.

The user interface 1200 may also include a third user interface element 1208 that is selectable to add a content item to the classification 1202. For example, selection of the third user interface element 1208 may cause the client device 102 to display an additional user interface 1210. The additional user interface 1210 may indicate an image 1212 that may be captured by a camera 1214 of the client device 102 in response to selection of an additional user interface element 1216. Selection of the additional user interface element 1216 may cause the image 1212 to be captured by the camera 1214 and may also cause a content item that includes the image to be classified according to the classification 1202. In this way, a content item that includes the image 1212 may be added to a collection of content items having the classification 1202 via a page dedicated to content items having the classification 1202, such as the page shown in the user interface 1200.

Figure 13:
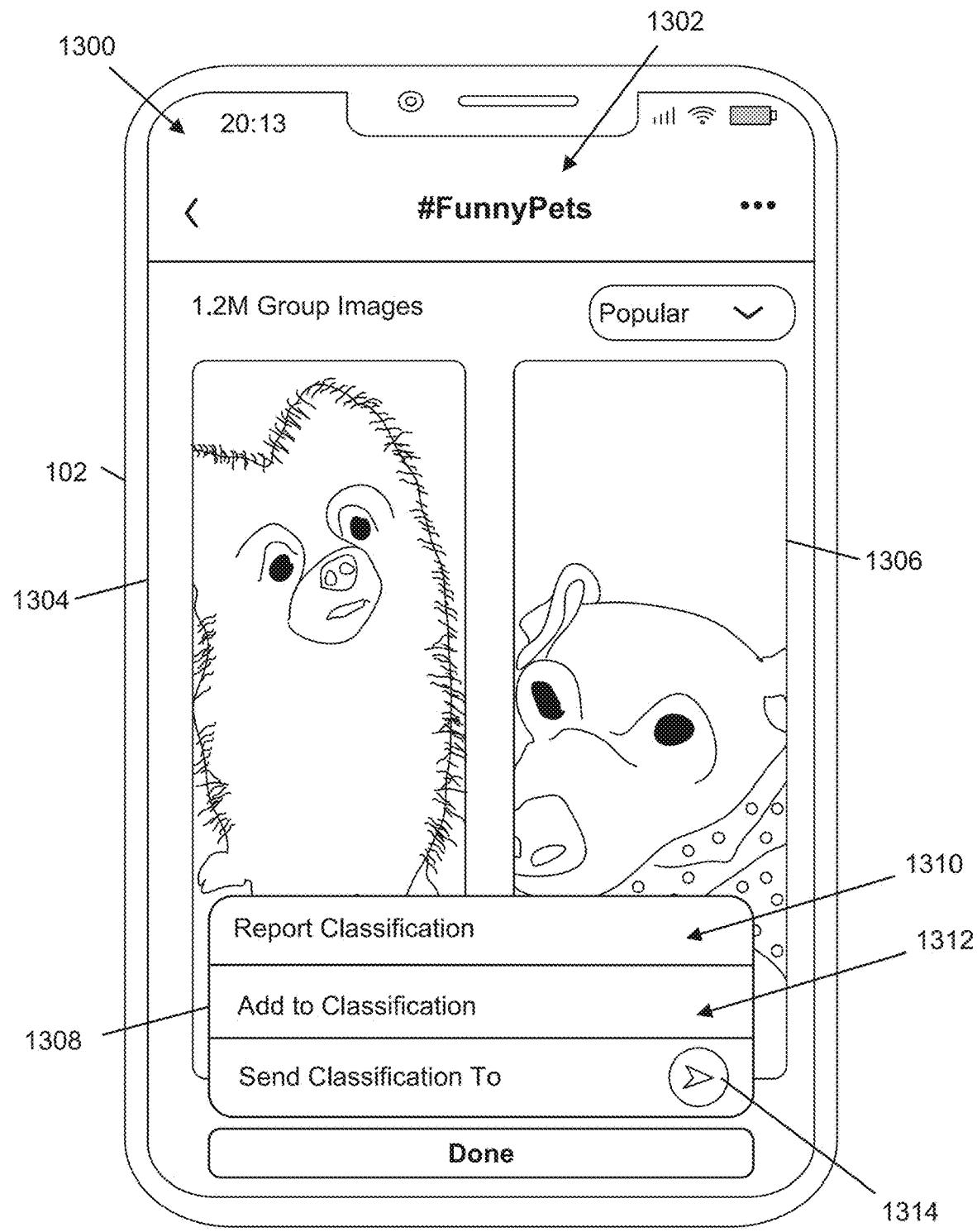
FIG. 13 is an illustration of a user interface that includes an option to share a classification, according to one or more example implementations.

FIG. 13 is an illustration of a user interface that includes an option to share a classification, according to one or more example implementations. The user interface 1300 may be displayed by a display device of a client device 102. In addition, the user interface 1300 may be displayed in conjunction with a client application executed by the client device 102, such as the client application 104 described with respect to FIG. 1. The user interface 1300 may include a number of user interface elements that correspond to content items associated with a classification 1302. For example, the user interface 1300 may include a first user interface element 1304 that corresponds to a first content item having the classification 1302 and a second user interface element 1306 that corresponds to a second content item having the classification 1302. The user interface 1300 may also include a third user interface element 1308 that includes a first selectable option 1310 to report the classification 1302 as being inappropriate, a second selectable option 1312 to add a content item to the classification 1302, and an additional option to share the classification 1302 with one or more additional users of the client application 104. In various examples, the classification 1302 may be shared with one or more additional users of the client application 104 by selection of a fourth user interface element 1314. In one or more implementations, selection of the fourth user interface element 1314 may cause an additional user interface to be displayed that includes one or more selectable user interface elements that individually correspond to additional users of the client application 104 with whom the classification 1302 and content items associated with the classification 1302 may be shared. Further, selection of the second selectable option 1312 may cause an additional user interface to be displayed that may be used to capture an image for which a content item may be created and associated with the classification 1302. In one or more illustrative examples, a user interface that is the same as or similar to the additional user interface 1210 may be displayed in response to selection of the second selectable option 1312.

Figure 14:
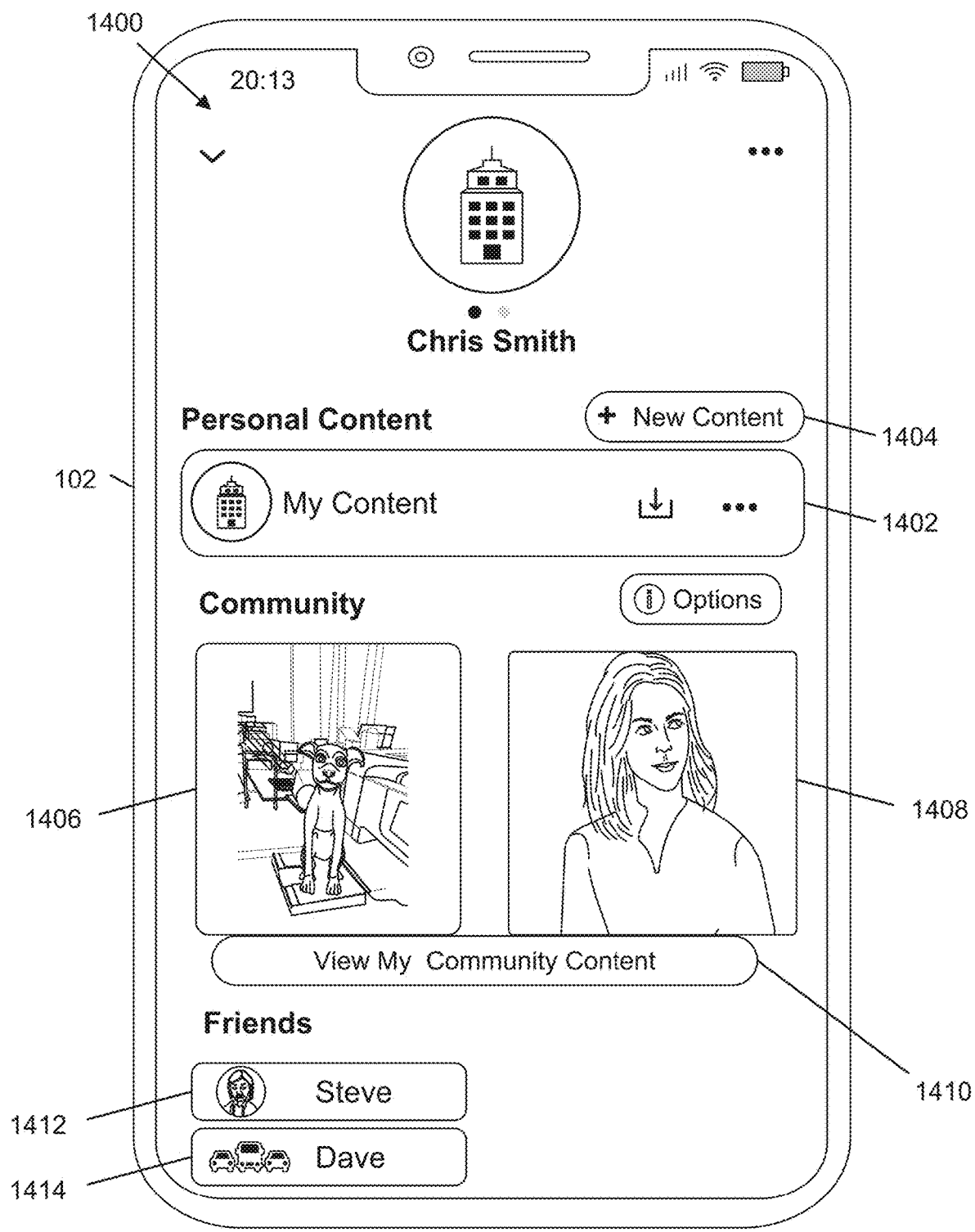
FIG. 14 is an illustration of a user interface to manage content associated with one or more classifications, according to one or more example implementations.

FIG. 14 is an illustration of a user interface to manage content associated with one or more classifications, according to one or more example implementations. The user interface 1400 may be displayed by a display device of a client device 102. In addition, the user interface 1400 may be displayed in conjunction with a client application executed by the client device 102, such as the client application 104 described with respect to FIG. 1. The user interface 1400 may include a number of user interface elements that may be selectable to manage content of a user of the client application 104. The user interface 1400 may include a first user interface element 1402 that is selectable to view one or more content items related to the user of the client application 104. In various examples, the first user interface element 1402 may be selectable to view one or more collections of content items related to the user of the client application 104. In addition, the user interface 1400 may include a second user interface element 1404 that is selectable to add content to one or more collections of content related to the user of the client application 104.

The user interface 1400 may also include a third user interface element 1406 and a fourth user interface element 1408 that may be selectable to view content of the user of the client application 104 that is associated with a respective classification. In one or more examples, the content items corresponding to the third user interface element 1406 and the fourth user interface element 1408 may be accessible to a larger audience than the content corresponding to the first user interface element 1402 and the second user interface element 1404. To illustrate, content corresponding to the first user interface element 1402 and the second user interface element 1404 may correspond to content that is accessible to one or more contacts of the user of the client application 104. Additionally, the content corresponding to the third user interface element 1406 and the fourth user interface element 1408 may be accessible publicly, such as accessible to users of the client application 104 that are not included in the contacts of the user of the client application 104. Selection of the third user interface element 1406 may cause a full-page version of the content corresponding to the third user interface element 1406 to be displayed in a user interface. Also, selection of the fourth user interface element 1408 may cause a full-page version of the content corresponding to the third user interface element 1406 to be displayed in a user interface.

The user interface 1400 may also include a fifth user interface element 1410 that is selectable to view additional content items of the user of the client application 104 having at least one classification in one or more additional user interfaces. In one or more examples, selection of the fifth user interface element 1410 may cause content items of the user of the client application 104 to be displayed according to at least one of date, location, or classification of the content items. Additionally, selection of the fifth user interface element 1410 may cause one or more user interfaces to be displayed that may include user interface elements to add content items, delete content items, modify a classification of content items, or combinations thereof. Additionally, the user interface 1400 may include a sixth user interface element 1412 to view content corresponding to a first contact of the user of the client application 104 and a seventh user interface element 1414 to view content corresponding to a second contact of the user of the client application 104.

Figure 15:
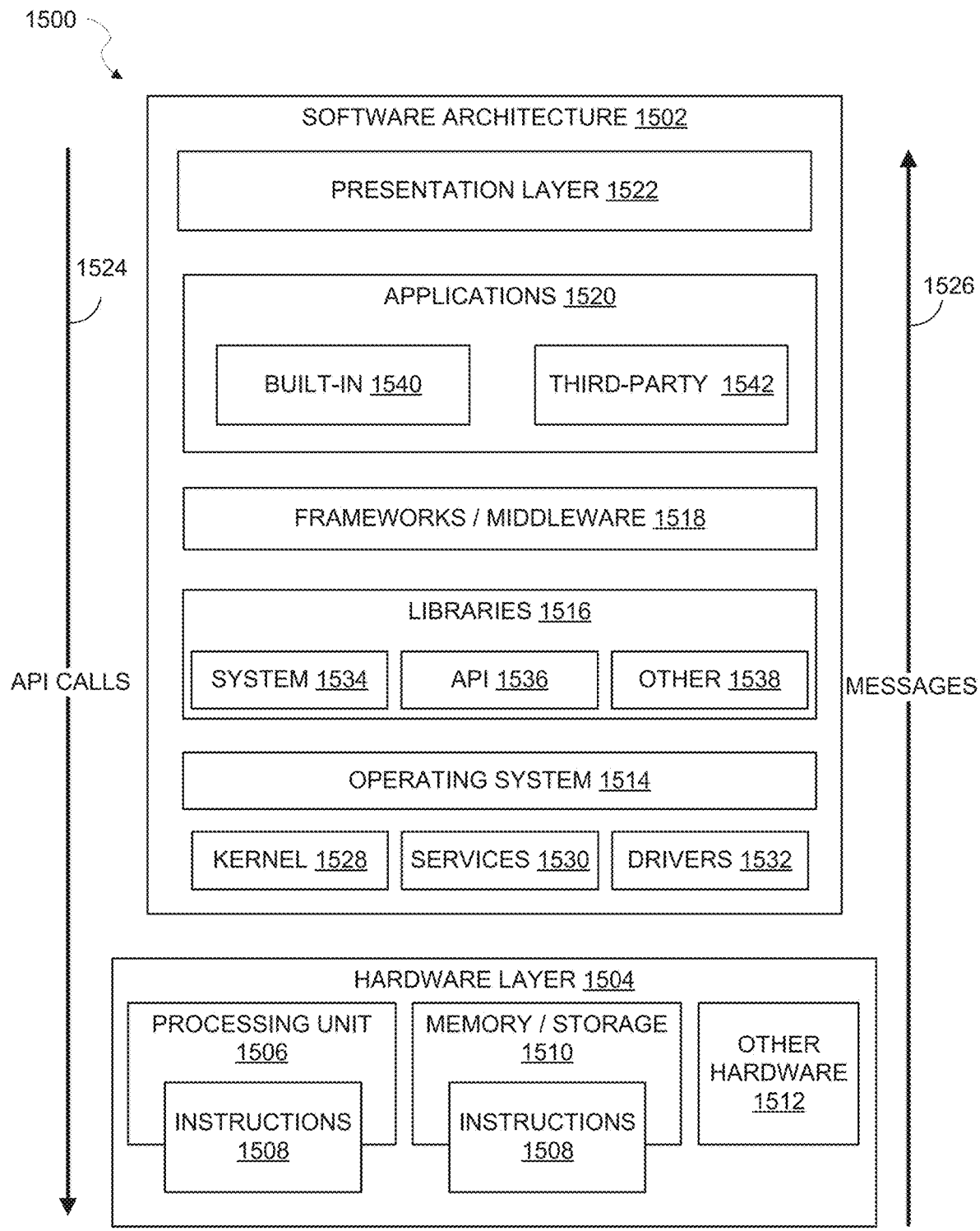
FIG. 15 is block diagram illustrating a representative software architecture that may be used in conjunction with one or more hardware architectures described herein, in accordance with one or more example implementations.

FIG. 15 is a block diagram illustrating system 1500 that includes an example software architecture 1502, which may be used in conjunction with various hardware architectures herein described. FIG. 15 is a non-limiting example of a software architecture and it will be appreciated that many other architectures may be implemented to facilitate the functionality described herein. The software architecture 1502 may execute on hardware such as machine 1600 of FIG. 16 that includes, among other things, processors 1604, memory/storage 1606, and input/output (I/O) components 1608. A representative hardware layer 1504 is illustrated and can represent, for example, the machine 1600 of FIG. 16. The representative hardware layer 1504 includes a processing unit 1506 having associated executable instructions 1508. Executable instructions 1508 represent the executable instructions of the software architecture 1502, including implementation of the methods, components, and so forth described herein. The hardware layer 1504 also includes at least one of memory or storage modules memory/storage 1510, which also have executable instructions 1508. The hardware layer 1504 may also comprise other hardware 1512.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520, and a presentation layer 1522. Operationally, the applications 1520 or other components within the layers may invoke API calls 1524 through the software stack and receive messages 1526 in response to the API calls 1524. The layers illustrated are representative in nature and not all software architectures have all layers. For example, some mobile or special purpose operating systems may not provide a frameworks/middleware 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, the kernel 1528 may be responsible for memory management, processor management (e.g., scheduling), component management, networking, security settings, and so on. The services 1530 may provide other common services for the other software layers. The drivers 1532 are responsible for controlling or interfacing with the underlying hardware. For instance, the drivers 1532 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1516 provide a common infrastructure that is used by at least one of the applications 1520, other components, or layers. The libraries 1516 provide functionality that allows other software components to perform tasks in an easier fashion than to interface directly with the underlying operating system 1514 functionality (e.g., kernel 1528, services 1530, drivers 1532). The libraries 1516 may include system libraries 1534 (e.g., C standard library) that may provide functions such as memory allocation functions, string manipulation functions, mathematical functions, and the like. In addition, the libraries 1516 may include API libraries 1536 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks/middleware 1518 (also sometimes referred to as middleware) provide a higher-level common infrastructure that may be used by the applications 1520 or other software components/modules. For example, the frameworks/middleware 1518 may provide various graphical user interface functions, high-level resource management, high-level location services, and so forth. The frameworks/middleware 1518 may provide a broad spectrum of other APIs that may be utilized by the applications 1520 or other software components/modules, some of which may be specific to a particular operating system 1514 or platform.

The applications 1520 include built-in applications 1540 and third-party applications 1542. Examples of representative built-in applications 1540 may include, but are not limited to, a contacts application, a browser application, a book reader application, a location application, a media application, a messaging application, or a game application. Third-party applications 1542 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1542 may invoke the API calls 1524 provided by the mobile operating system (such as operating system 1514) to facilitate functionality described herein.

The applications 1520 may use built-in operating system functions (e.g., kernel 1528, services 1530, drivers 1532), libraries 1516, and frameworks/middleware 1518 to create UIs to interact with users of the system. Alternatively, or additionally, in some systems, interactions with a user may occur through a presentation layer, such as presentation layer 1522. In these systems, the application/component "logic" can be separated from the aspects of the application/component that interact with a user.

Figure 16:
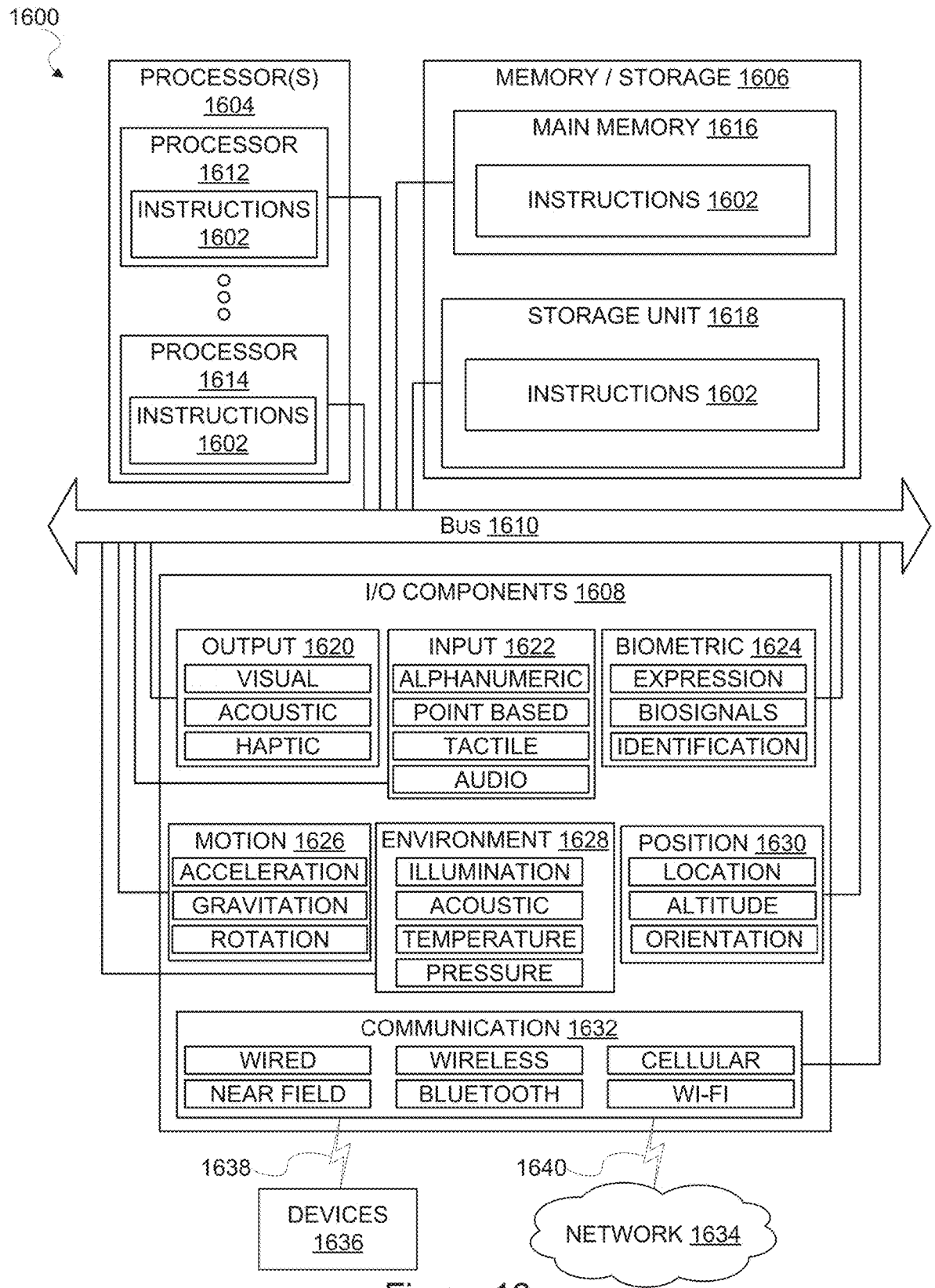
FIG. 16 is a block diagram illustrating components of a machine, in the form of a computer system, that may read and execute instructions from one or more machine-readable media to perform any one or more methodologies described herein, in accordance with one or more example implementations.

FIG. 16 is a block diagram illustrating components of a machine 1600, according to some example implementations, able to read instructions from a machine-readable medium (e.g., a machine-readable storage medium) and perform any one or more of the methodologies discussed herein. Specifically, FIG. 16 shows a diagrammatic representation of the machine 1600 in the example form of a computer system, within which instructions 1602 (e.g., software, a program, an application, an applet, an app, or other executable code) for causing the machine 1600 to perform any one or more of the methodologies discussed herein may be executed. As such, the instructions 1602 may be used to implement modules or components described herein. The instructions 1602 transform the general, non-programmed machine 1600 into a particular machine 1600 programmed to carry out the described and illustrated functions in the manner described. In alternative implementations, the machine 1600 operates as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1602, sequentially or otherwise, that specify actions to be taken by machine 1600. Further, while only a single machine 1600 is illustrated, the term "machine" shall also be taken to include a collection of machines that individually or jointly execute the instructions 1602 to perform any one or more of the methodologies discussed herein.

The machine 1600 may include processors 1604, memory/storage 1606, and I/O components 1608, which may be configured to communicate with each other such as via a bus 1610. In an example implementation, the processors 1604 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RI/IC), another processor, or any suitable combination thereof) may include, for example, a processor 1612 and a processor 1614 that may execute the instructions 1602. The term "processor" is intended to include multi-core processors 1604 that may comprise two or more independent processors (sometimes referred to as "cores") that may execute instructions 1602 contemporaneously. Although FIG. 16 shows multiple processors 1604, the machine 1600 may include a single processor 1612 with a single core, a single processor 1612 with multiple cores (e.g., a multi-core processor), multiple processors 1612, 1614 with a single core, multiple processors 1612, 1614 with multiple cores, or any combination thereof.

The memory/storage 1606 may include memory, such as a main memory 1616, or other memory storage, and a storage unit 1618, both accessible to the processors 1604 such as via the bus 1610. The storage unit 1618 and main memory 1616 store the instructions 1602 embodying any one or more of the methodologies or functions described herein. The instructions 1602 may also reside, completely or partially, within the main memory 1616, within the storage unit 1618, within at least one of the processors 1604 (e.g., within the processor's cache memory), or any suitable combination thereof, during execution thereof by the machine 1600. Accordingly, the main memory 1616, the storage unit 1618, and the memory of processors 1604 are examples of machine-readable media.

The I/O components 1608 may include a wide variety of components to receive input, provide output, produce output, transmit information, exchange information, capture measurements, and so on. The specific I/O components 1608 that are included in a particular machine 1600 will depend on the type of machine. For example, portable machines such as mobile phones will likely include a touch input device or other such input mechanisms, while a headless server machine will likely not include such a touch input device. It will be appreciated that the I/O components 1608 may include many other components that are not shown in FIG. 16. The I/O components 1608 are grouped according to functionality merely for simplifying the following discussion and the grouping is in no way limiting. In various example implementations, the I/O components 1608 may include output components 1620 and input components 1622. The output components 1620 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1622 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 1608 may include biometric components 1624, motion components 1626, environmental components 1628, or position components 1630 among a wide array of other components. For example, the biometric components 1624 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1626 may include acceleration sensor components (e.g., accelerometer), gravitation sensor components, rotation sensor components (e.g., gyroscope), and so forth. The environmental components 1628 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1630 may include location sensor components (e.g., a GPS receiver component), altitude sensor components (e.g., altimeters or barometers that detect air pressure from which altitude may be derived), orientation sensor components, magnetometers), and the like.

Communication may be implemented using a wide variety of technologies. The I/O components 1608 may include communication components 1632 operable to couple the machine 1600 to a network 1634 or devices 1636 via coupling 1638 and coupling 1640, respectively. For example, the communication components 1632 may include a network interface component or other suitable device to interface with the network 1634. In further examples, communication components 1632 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1636 may be another machine 1600 or any of a wide variety of peripheral devices (e.g., a peripheral device coupled via a USB).

Moreover, the communication components 1632 may detect identifiers or include components operable to detect identifiers. For example, the communication components 1632 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1632, such as location via Internet Protocol (IP) geo-location, location via Wi-Fi® signal triangulation, location via detecting an NFC beacon signal that may indicate a particular location, and so forth.

Glossary

"CARRIER SIGNAL," in this context, refers to any intangible medium that is capable of storing, encoding, or carrying transitory or non-transitory instructions 1602 for execution by the machine 1600, and includes digital or analog communications signals or other intangible medium to facilitate communication of such instructions 1602.

Instructions 1602 may be transmitted or received over the network 110, 1634 using a transitory or non-transitory transmission medium via a network interface device and using any one of a number of well-known transfer protocols.

"CLIENT DEVICE," in this context, refers to any machine 1600 that interfaces to a communications network 110, 1634 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 1634.

"COMMUNICATIONS NETWORK," in this context, refers to one or more portions of a network 110, 1634 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 1634 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM," in this context, refers to a component, device, or other tangible media able to store instructions 1602 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) or any suitable combination thereof. The term "machine-readable medium" should be taken to include a single medium or multiple media (e.g., a centralized or distributed database, or associated caches and servers) able to store instructions 1610. The term "machine-readable medium" shall also be taken to include any medium, or combination of multiple media, that is capable of storing instructions 1602 (e.g., code) for execution by a machine 1600, such that the instructions 1602, when executed by one or more processors 1604 of the machine 1600, cause the machine 1600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 1604 or other programmable processor. Once configured by such software, hardware components become specific machines (or specific components of a machine 1600) uniquely tailored to perform the configured functions and are no longer general-purpose processors 1604. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 1604 configured by software to become a special-purpose processor, the general-purpose processor 1604 may be configured as respectively different special-purpose processors (e.g., comprising different hardware components) at different times. Software accordingly configures a particular processor 1612, 1614 or processors 1604, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 1604 that are temporarily configured (e.g., by software) or permanently configured to perform the relevant operations. Whether temporarily or permanently configured, such processors 1604 may constitute processor-implemented components that operate to perform one or more operations or functions described herein. As used herein, "processor-implemented component" refers to a hardware component implemented using one or more processors 1604. Similarly, the methods described herein may be at least partially processor-implemented, with a particular processor 1612, 1614 or processors 1604 being an example of hardware. For example, at least some of the operations of a method may be performed by one or more processors 1604 or processor-implemented components. Moreover, the one or more processors 1604 may also operate to support performance of the relevant operations in a "cloud computing" environment or as a "software as a service" (SaaS). For example, at least some of the operations may be performed by a group of computers (as examples of machines 1600 including processors 1604), with these operations being accessible via a network 110, 1634 (e.g., the Internet) and via one or more appropriate interfaces (e.g., an API). The performance of certain of the operations may be distributed among the processors, not only residing within a single machine 1600, but deployed across a number of machines. In some example implementations, the processors 1604 or processor-implemented components may be located in a single geographic location (e.g., within a home environment, an office environment, or a server farm). In other example implementations, the processors 1604 or processor-implemented components may be distributed across a number of geographic locations.

"PROCESSOR," in this context, refers to any circuit or virtual circuit (a physical circuit emulated by logic executing on an actual processor 1604) that manipulates data values according to control signals (e.g., "commands," "op codes," "machine code," etc.) and which produces corresponding output signals that are applied to operate a machine 1600. A processor 1604 may, for example, be a CPU, a RISC processor, a CISC processor, a GPU, a DSP, an ASIC, a RFIC or any combination thereof. A processor 1608 may further be a multi-core processor having two or more independent processors 1604 (sometimes referred to as "cores") that may execute instructions 1602 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:

receiving, by one or more computing devices of a server system, content item data from a first computing device, the content item data including image data corresponding to an image of a content item and overlay data corresponding to an overlay of the image, wherein the overlay data includes text data that corresponds to first text content of the overlay;

performing, by the one or more computing devices, an analysis of the first text content in relation to second text content of individual identifiers of a plurality of classifications;

determining, by the one or more computing devices, a measure of similarity between a first portion of the first text content and at least a portion of the second text content that is related to an identifier of a classification, wherein a second portion of the first text content includes at least one of words, letters, symbols, or numbers that do not correspond to identifiers of classifications;

determining, by the one or more computing devices and based on the measure of similarity corresponding to at least a threshold level of similarity, a classification for the content item based at least partly on the overlay data;

adding, by the one or more computing devices, the content item to a group of content items having the classification;

receiving, by the one or more computing devices and from a second client device, a request for content items having the classification;

identifying, by the one or more computing devices and in response to the request, at least a portion of the group of content items, the at least a portion of the group of content items including the content item; and sending, by the one or more computing devices, user interface data to the second client device in response to the request, the user interface data being configured to produce one or more user interfaces that include at least the portion of the group of content items.

2. The method of claim 1, wherein the content item corresponds to an additional classification; and the method comprises:

adding the content item to an additional group of content items having the additional classification.

3. The method of claim 1, comprising:

receiving additional input to add augmented reality content to modify at least a portion of the image.

4. The method of claim 1, wherein the overlay data indicates a creative tool used to produce the overlay, and determining the classification of the content item is based at least partly on determining that at least one of a first identifier of the creative tool or a second identifier of the overlay correspondes to a third identifier of the classification.

5. The method of claim 1, comprising:
analyzing the image data to determine an object included in the image;
determining an identifier of the object; and
determining that the identifier of the object has at least a threshold level of correspondence with an additional identifier of the classification; and
wherein the classification for the content item is based at least partly on the identifier of the object having at least the threshold level of correspondence with the additional identifier of the classification.

6. The method of claim 1, comprising:
determining one or more first characteristics of a user of the second client device;
determining one or more second characteristics of the group of content items having the classification;
performing an analysis of the one or more first characteristics with respect to the one or more second characteristics; and
determining a respective level of interest for individual content items of the group of content items in relation to the user of the second client device based on the analysis.

7. The method of claim 6, comprising:
determining rankings for the group of content items based on respective levels of interest for the individual content items of the group of content items in relation to the user of the second client device, wherein the rankings indicate an order in which the individual content items are to be displayed in at least one user interface of the one or more user interfaces.

8. The method of claim 7, wherein:
a first content item of the group of content items has a first ranking that corresponds to a first level of interest with respect to the user of the second client device;
a second content item of the group of content items has a second ranking that is lower than the first ranking and that corresponds to a second level of interest with respect to the user of the second client device that is less than the first level of interest; and
the first content item is presented before the second content item in the at least one user interface.

9. The method of claim 7, comprising obtaining additional data from a representative of a service provider that provides services in relation to a client application used to produce the content item, the additional data corresponding to a weighting of an additional content item included in the group of content items; and
wherein a ranking of the additional content item is based at least partly on the weighting.

10. The method of claim 7, comprising determining one or more third characteristics of an additional user of an additional client device executing a respective instance of a client application used to produce content items, the additional user being a creator of an additional content item included in the group of content items; and
wherein a ranking of the additional content item is based at least partly on the one or more third characteristics of the additional user.

11. A system comprising:
one or more hardware processors; and
one or more non-transitory computer-readable storage media including computer-readable instructions that, when executed by the one or more hardware processors, cause the one or more hardware processors to perform operations comprising:
receiving content item data from a first client device, the content item data including image data corresponding to an image of a content item and overlay data corresponding to an overlay of the image with the overlay being produced by a client application, wherein the overlay data includes text data that corresponds to first text content of the overlay;
performing an analysis of the first text content in relation to second text content of individual identifiers of a plurality of classifications;
determining a measure of similarity between a first portion of the first text content and at least a portion of the second text content that is related to an identifier of a classification, wherein a second portion of the first text content includes at least one of words, letters, symbols, or numbers that do not correspond to identifiers of classifications;
determining, based on the measure of similarity corresponding to at least a threshold level of similarity, a classification for the content item based at least partly on the overlay data;
adding the content item to a group of content items having the classification;
receiving, from a second client device, a request for content items having the classification;
identifying, in response to the request, at least a portion of the group of content items, the at least a portion of the group of content items including the content item; and
sending user interface data to the second client device in response to the request, the user interface data being configured to produce one or more user interfaces that include at least the portion of the group of content items.

12. The system of claim 11, wherein the one or more non-transitory computer-readable storage media include additional computer-readable instructions that, when executed by the one or more hardware processors, cause the one or more hardware processors to perform additional operations comprising:
receiving, from the first client device, an additional request for content items corresponding to the classification;
determining, in response to the additional request, a number of content items having the classification; and
sending additional content item data to the first client device, the additional content item data corresponding to the number of content items having the classification and indicating an order in which to present individual content items of the number of content items in at least one user interface of the client application.

13. The system of claim 12, wherein the one or more non-transitory computer-readable storage media include additional computer-readable instructions that, when executed by the one or more hardware processors, cause the one or more hardware processors to perform additional operations comprising:
determining rankings of the individual content items of the number of content items, the rankings indicating respective levels of interest of the individual content items in relation to a user of the client application; and
determining the order in which to present the individual content items based on the rankings.

14. The system of claim 12, wherein:
the one or more non-transitory computer-readable storage media include additional computer-readable instructions that, when executed by the one or more hardware processors, cause the one or more hardware processors to perform additional operations comprising sending additional user interface data to the first client device in response to the additional request, the additional user interface data corresponding to one or more additional user interfaces of the client application that include a page having at least a portion of the number of content items having the classification and a user interface element that is selectable to add at least one additional content item to the classification.

15. The system of claim 11, wherein the one or more non-transitory computer-readable storage media include additional computer-readable instructions that, when executed by the one or more hardware processors, cause the one or more hardware processors to perform additional operations comprising:
storing the content item in a database in association with the classification; and
retrieving data corresponding to the content item from the database in response to the request from the second client device for content items having the classification.

16. One or more non-transitory computer-readable media storing computer-readable instructions that, when executed by one or more processors, cause the one or more processors to perform operations comprising:
receiving content item data from a first client device, the content item data including image data corresponding to an image of a content item and overlay data corresponding to an overlay of the image with the overlay being produced by a client application, wherein the overlay data includes text data that corresponds to first text content of the overlay;
performing an analysis of the first text content in relation to second text content of individual identifiers of a plurality of classifications;
determining a measure of similarity between a first portion of the first text content and at least a portion of the second text content that is related to an identifier of a classification, wherein a second portion of the first text content includes at least one of words, letters, symbols, or numbers that do not correspond to identifiers of classifications;
determining, based on the measure of similarity corresponding to at least a threshold level of similarity, a classification for the content item based at least partly on the overlay data;
adding the content item to a group of content items having the classification;
receiving, from a second client device, a request for content items having the classification;
identifying, in response to the request, at least a portion of the group of content items, the at least a portion of the group of content items including the content item; and
sending user interface data to the second client device in response to the request, the user interface data being configured to produce one or more user interfaces that include at least the portion of the group of content items.

17. The one or more computer-readable media of claim 16, wherein the overlay data indicates a creative tool used to produce the overlay, and determining the classification of the content item is based at least partly on determining that at least one of a first identifier of the creative tool or a second identifier of the overlay corresponds to a third identifier of the classification.

18. The one or more computer-readable media of claim 16 storing additional computer-readable instructions that, when executed by the one or more processors, cause the one or more processors to perform additional operations comprising:
analyzing the image data to determine an object included in the image;
determining an identifier of the object; and
determining that the identifier of the object has at least a threshold level of correspondence with an additional identifier of the classification; and
wherein the classification for the content item is based at least partly on the identifier of the object having at least the threshold level of correspondence with the additional identifier of the classification.

19. The one or more computer-readable media of claim 16, storing additional computer-readable instructions that, when executed by the one or more processors, cause the one or more processors to perform additional operations comprising:
receiving, from the first client device, an additional request for content items corresponding to the classification;
determining, in response to the additional request, a number of content items having the classification; and
sending additional content item data to the first client device, the additional content item data corresponding to the number of content items having the classification and indicating an order in which to present individual content items of the number of content items in at least one user interface of the client application.

20. The one or more computer-readable media of claim 19, storing additional computer-readable instructions that, when executed by the one or more processors, cause the one or more processors to perform additional operations comprising:
determining rankings of the individual content items of the number of content items, the rankings indicating respective levels of interest of the individual content items in relation to a user of the client application; and
determining the order in which to present the individual content items based on the rankings.

* * * * *